(12) United States Patent
Hu et al.

(10) Patent No.: US 11,930,568 B2
(45) Date of Patent: *Mar. 12, 2024

(54) CONTROLLER FOR CONTROLLING A LIGHT SOURCE MODULE

(71) Applicant: O2Micro, Inc., Santa Clara, CA (US)

(72) Inventors: Rong Hu, Beijing (CN); Yung-Lin Lin, Palo Alto, CA (US); Naoyuki Fujita, Tokyo (JP)

(73) Assignee: O2Micro Inc., Santa Clara, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 17/313,709

(22) Filed: May 6, 2021

(65) Prior Publication Data
US 2021/0259073 A1    Aug. 19, 2021

Related U.S. Application Data

(63) Continuation-in-part of application No. 16/518,316, filed on Jul. 22, 2019, now Pat. No. 11,032,881.

(51) Int. Cl.
*H05B 45/14* (2020.01)
*H05B 45/397* (2020.01)
*H05B 45/46* (2020.01)

(52) U.S. Cl.
CPC ........... *H05B 45/14* (2020.01); *H05B 45/397* (2020.01); *H05B 45/46* (2020.01)

(58) Field of Classification Search
None
See application file for complete search history.

(56) References Cited

U.S. PATENT DOCUMENTS

| | | | |
|---|---|---|---|
| 5,741,183 A | 4/1998 | Acres | |
| 6,118,186 A | 9/2000 | Scott | |
| 6,166,496 A | 12/2000 | Lys | |
| 6,459,919 B1 | 10/2002 | Lys | |
| 6,795,009 B2 * | 9/2004 | Duffy | H02M 3/1584 |
| | | | 323/283 |
| 6,801,146 B2 * | 10/2004 | Kernahan | H03L 7/0996 |
| | | | 341/122 |
| 6,906,502 B2 * | 6/2005 | Kernahan | H02M 1/0845 |
| | | | 361/91.7 |
| 6,909,266 B2 * | 6/2005 | Kernahan | H02M 3/156 |
| | | | 323/222 |

(Continued)

FOREIGN PATENT DOCUMENTS

| CN | 111867186 A | * 10/2020 | ........... B60Q 1/0076 |
|---|---|---|---|
| CN | 111867186 B | * 12/2022 | ........... B60Q 1/0076 |

*Primary Examiner* — Srinivas Sathiraju

(57) ABSTRACT

A controller for controlling a light source module including a first LED array and a second LED array includes a first driving terminal and a second driving terminal. The controller is operable for turning on a switch between a power converter and the first LED array by the first driving terminal to deliver electric power from the power converter to the first LED array in a first sequence of discrete time slots, and for turning on a second switch between the power converter and the second LED array by the second driving terminal to deliver electric power from the power converter to the second LED array in a second sequence of discrete time slots, where the first sequence of discrete time slots and the second sequence of discrete time slots are mutually exclusive.

25 Claims, 24 Drawing Sheets

(56) References Cited

U.S. PATENT DOCUMENTS

| | | | | |
|---|---|---|---|---|
| 6,911,809 B2* | 6/2005 | Kernahan | ............ | H02M 3/156 323/283 |
| 6,912,139 B2* | 6/2005 | Kernahan | ............ | H03K 19/215 363/41 |
| 7,279,995 B2* | 10/2007 | Kernahan | ............ | H03K 23/40 331/34 |
| 8,278,830 B2 | 10/2012 | Archibald | | |
| 8,334,662 B2 | 12/2012 | Jin | | |
| 8,368,636 B2 | 2/2013 | Shteynberg | | |
| 8,410,716 B2 | 4/2013 | Yao | | |
| 8,704,456 B2 | 4/2014 | Shteynberg | | |
| 8,716,947 B2 | 5/2014 | Elder | | |
| 8,749,177 B2 | 6/2014 | Shteynberg | | |
| 8,990,464 B2* | 3/2015 | Kessler | ............ | G06F 13/364 710/110 |
| 9,041,305 B2 | 5/2015 | Shteynberg | | |
| 9,370,066 B2 | 6/2016 | Han | | |
| 9,417,944 B2* | 8/2016 | Kessler | ............ | G06F 9/4411 |
| 9,433,047 B2 | 8/2016 | Huynh | | |
| 9,451,664 B2 | 9/2016 | Jin | | |
| 9,468,064 B1 | 10/2016 | Wu | | |
| 9,478,175 B2 | 10/2016 | Lim | | |
| 9,531,931 B2 | 12/2016 | Patel | | |
| 9,578,728 B2* | 2/2017 | Hebborn | ............ | H05B 45/58 |
| 9,661,697 B2* | 5/2017 | Sadwick | ............ | H05B 45/18 |
| 9,699,839 B2* | 7/2017 | Lai | ............ | H05B 45/24 |
| 9,750,102 B1* | 8/2017 | Mao | ............ | H05B 45/3725 |
| 9,788,376 B2 | 10/2017 | Mio | | |
| 9,835,668 B2 | 12/2017 | Kriebernegg | | |
| 9,837,913 B1* | 12/2017 | Xiong | ............ | H02M 3/3376 |
| 9,860,946 B2 | 1/2018 | LoCascio | | |
| 9,867,240 B2* | 1/2018 | van den Broeke | ..... | H02M 1/14 |
| 9,875,152 B2* | 1/2018 | Kessler | ............ | G06F 13/426 |
| 9,893,632 B2* | 2/2018 | Freeman | ............ | H02M 3/33546 |
| 10,039,171 B1* | 7/2018 | Li | ............ | H05B 45/14 |
| 10,141,830 B1* | 11/2018 | Chung | ............ | H05B 45/10 |
| 10,278,251 B1 | 4/2019 | Fledderman | | |
| 10,333,341 B2* | 6/2019 | Catalano | ............ | H02J 9/061 |
| 10,362,652 B1* | 7/2019 | Xiong | ............ | H02M 1/15 |
| 10,560,990 B1* | 2/2020 | Fragiacomo | ......... | B60Q 1/0076 |
| 10,594,916 B2 | 3/2020 | Sivan | | |
| 10,721,804 B2 | 7/2020 | Chan | | |
| 10,732,714 B2 | 8/2020 | Rao | | |
| 10,734,897 B2 | 8/2020 | Petersen | | |
| 10,893,591 B2* | 1/2021 | Lee | ............ | H05B 45/46 |
| 11,032,881 B2* | 6/2021 | Hu | ............ | H05B 39/047 |
| 11,388,799 B2* | 7/2022 | Williams | ............ | A61N 5/06 |
| 2003/0100837 A1 | 5/2003 | Lys | | |
| 2004/0046535 A1* | 3/2004 | Duffy | ............ | H02M 3/157 323/283 |
| 2004/0095081 A1* | 5/2004 | Kernahan | ......... | H05B 41/3927 315/307 |
| 2004/0095108 A1* | 5/2004 | Kernahan | ......... | H03K 19/0963 323/282 |
| 2004/0095112 A1* | 5/2004 | Kernahan | ......... | H02M 1/0845 323/282 |
| 2004/0095116 A1* | 5/2004 | Kernahan | ............ | G06F 1/24 713/300 |
| 2004/0095164 A1* | 5/2004 | Kernahan | ............ | G11C 27/02 327/94 |
| 2004/0095266 A1* | 5/2004 | Kernahan | ............ | G05F 3/262 341/165 |
| 2005/0156644 A1* | 7/2005 | Karnahan | ......... | H03K 19/0963 327/218 |
| 2005/0162138 A1* | 7/2005 | Kernahan | ............ | H03K 19/215 323/234 |
| 2010/0311488 A1 | 12/2010 | Miller | | |
| 2010/0311494 A1 | 12/2010 | Miller | | |
| 2010/0312625 A1 | 12/2010 | Miller | | |
| 2013/0124763 A1* | 5/2013 | Kessler | ............ | G06F 11/0754 710/110 |
| 2013/0249429 A1 | 9/2013 | Woytowitz | | |
| 2014/0025999 A1* | 1/2014 | Kessler | ............ | G06F 9/4411 710/110 |
| 2015/0068069 A1 | 3/2015 | Tran | | |
| 2015/0237700 A1 | 8/2015 | Woytowitz | | |
| 2015/0301968 A1* | 10/2015 | Kessler | ............ | G06F 11/0754 710/110 |
| 2016/0044759 A1* | 2/2016 | Lai | ............ | H05B 45/48 315/186 |
| 2016/0116925 A1* | 4/2016 | Freeman | ............ | H02M 3/33515 307/130 |
| 2016/0118905 A1* | 4/2016 | Freeman | ............ | H02M 3/33515 363/21.1 |
| 2016/0118906 A1* | 4/2016 | Freeman | ............ | H02M 3/33515 363/21.05 |
| 2016/0316536 A1* | 10/2016 | Oepts | ............ | H05B 45/12 |
| 2017/0099011 A1* | 4/2017 | Freeman | ............ | H02M 7/06 |
| 2017/0238383 A1* | 8/2017 | Lai | ............ | H05B 45/3725 315/186 |
| 2017/0279300 A1* | 9/2017 | Catalano | ............ | H05B 45/3725 |
| 2018/0321748 A1 | 11/2018 | Rao | | |
| 2019/0041008 A1 | 2/2019 | Xiong | | |
| 2019/0058242 A1 | 2/2019 | Tabe | | |
| 2019/0154439 A1 | 5/2019 | Binder | | |
| 2019/0182415 A1 | 6/2019 | Sivan | | |
| 2019/0246463 A1* | 8/2019 | Williams | ............ | A61N 5/06 |
| 2019/0254130 A1* | 8/2019 | Chen | ............ | H05B 45/14 |
| 2019/0267834 A1* | 8/2019 | Catalano | ............ | H05B 45/10 |
| 2019/0313503 A1 | 10/2019 | Woytowitz | | |
| 2020/0106356 A1* | 4/2020 | Petersen | ............ | H02M 3/156 |
| 2020/0195833 A1 | 6/2020 | Sivan | | |
| 2020/0245432 A1* | 7/2020 | Lee | ............ | H05B 45/10 |
| 2020/0253023 A1 | 8/2020 | Bedell | | |
| 2020/0256521 A1 | 8/2020 | Xiong | | |
| 2021/0021151 A1* | 1/2021 | Motsenbocker | ....... | H05B 45/14 |
| 2021/0259073 A1* | 8/2021 | Hu | ............ | H05B 45/345 |
| 2022/0191989 A1* | 6/2022 | Williams | ............ | H05B 45/46 |

* cited by examiner

CONTROLLER FOR CONTROLLING A LIGHT SOURCE MODULE

RELATED APPLICATION

This application is a continuation-in-part application of the U.S. application Ser. No. 16/518,316, now U.S. Pat. No. 11,032,881, titled "Controller for Controlling Light Source Module," filed on Jul. 22, 2019, which is hereby incorporated by reference in its entirety.

BACKGROUND

In a Light-Emitting Diode (LED) display system such as a Liquid Crystal Display (LCD) TV, a controller is used to control the power of multiple LED strings for back-lighting. Because the controller has a given number of control pins, only a limited number of LED strings can be controlled by one controller. To control more LED strings, more controllers are needed, which increases the cost of the system.

SUMMARY

In embodiments, a controller for controlling a light source module including a first LED array and a second LED array includes a first driving terminal and a second driving terminal. The controller is operable for turning on a switch between a power converter and the first LED array by the first driving terminal to deliver electric power from the power converter to the first LED array in a first sequence of discrete time slots, and for turning on a second switch between the power converter and the second LED array by the second driving terminal to deliver electric power from the power converter to the second LED array in a second sequence of discrete time slots, where the first sequence of discrete time slots and the second sequence of discrete time slots are mutually exclusive.

In other embodiments, a controller is coupled to a power source and is operable for controlling a light source module including a first LED array and a second LED array. Each array of the first LED array and each array of the second LED array includes multiple LED strings. The controller includes a decoding module and a residual image cancelation module. The decoding module is operable for controlling a first switch coupled between a power converter and the first LED array, and for controlling a second switch coupled between the power converter and the second LED array, to alternately deliver power to the first LED array and to the second LED array. The residual image cancelation module is coupled to the decoding module and is operable for regulating a voltage across each LED string in the first LED array to below a threshold and for regulating a voltage across each LED string in the second LED array to below the threshold.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in combination with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
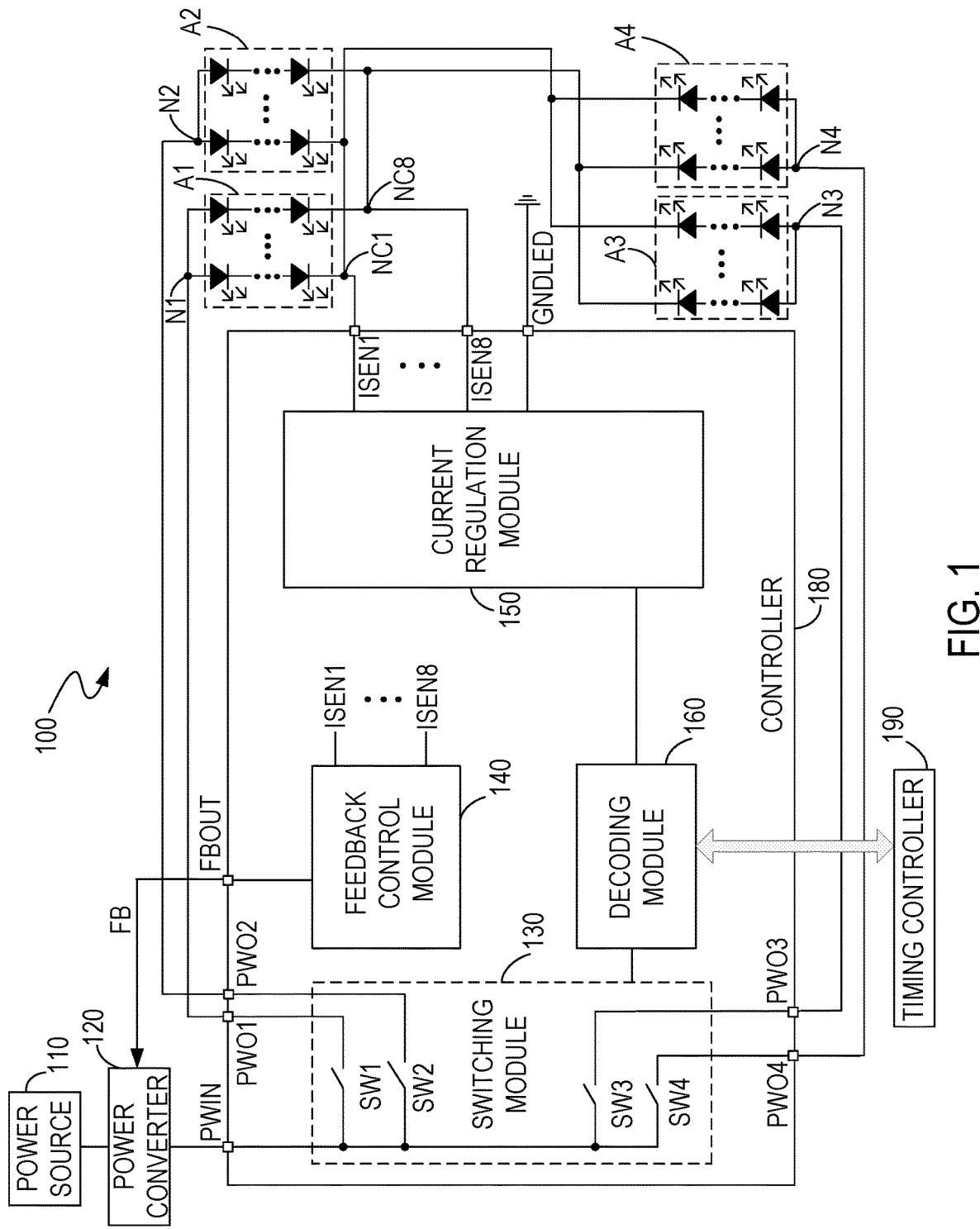
FIG. 1 shows a light source driving circuit including a controller for controlling a light source module, in accordance with embodiments of the present invention.

FIG. 1 shows a light source driving circuit 100 including a controller 180 for controlling a light source module, in accordance with embodiments of the present invention. In the example of FIG. 1, the light source module includes four LED arrays A1, A2, A3 and A4, where each LED array includes multiple (e.g., eight) LED strings. This example is used as the basis for the discussion below; however, the invention is not limited to four LED arrays and/or eight LED strings per array.

The controller 180 receives electric power from a power converter 120. The power converter 120 is coupled between the controller 180 and a power source 110. The controller 180 includes a power input terminal PWIN, a feedback terminal FBOUT, multiple power output terminals PWO1-PWO4 and multiple current sensing terminals ISEN1-ISEN8. The number of the power output terminals is equal to the number of the LED arrays. The number of the current sensing terminals is equal to the number of the LED strings in each LED array. The controller 180 includes a switching module 130, a feedback control module 140, a current regulation module 150 and a decoding module 160.

The power input terminal PWIN is coupled to the power source 110 through the power converter 120 and is operable for receiving electric power from the power converter 120. The power output terminals PWO1-PWO4 are coupled to the LED arrays A1-A4, respectively. The controller 180 is operable for delivering the electric power to the LED arrays A1-A4 via the power output terminals PWO1-PWO4 in a first sequence, a second sequence, a third sequence, and a fourth sequence of discrete time slots, respectively. The first, second, third and fourth sequences of discrete time slots are mutually exclusive; that is, they do not overlap in time.

Figure 3:
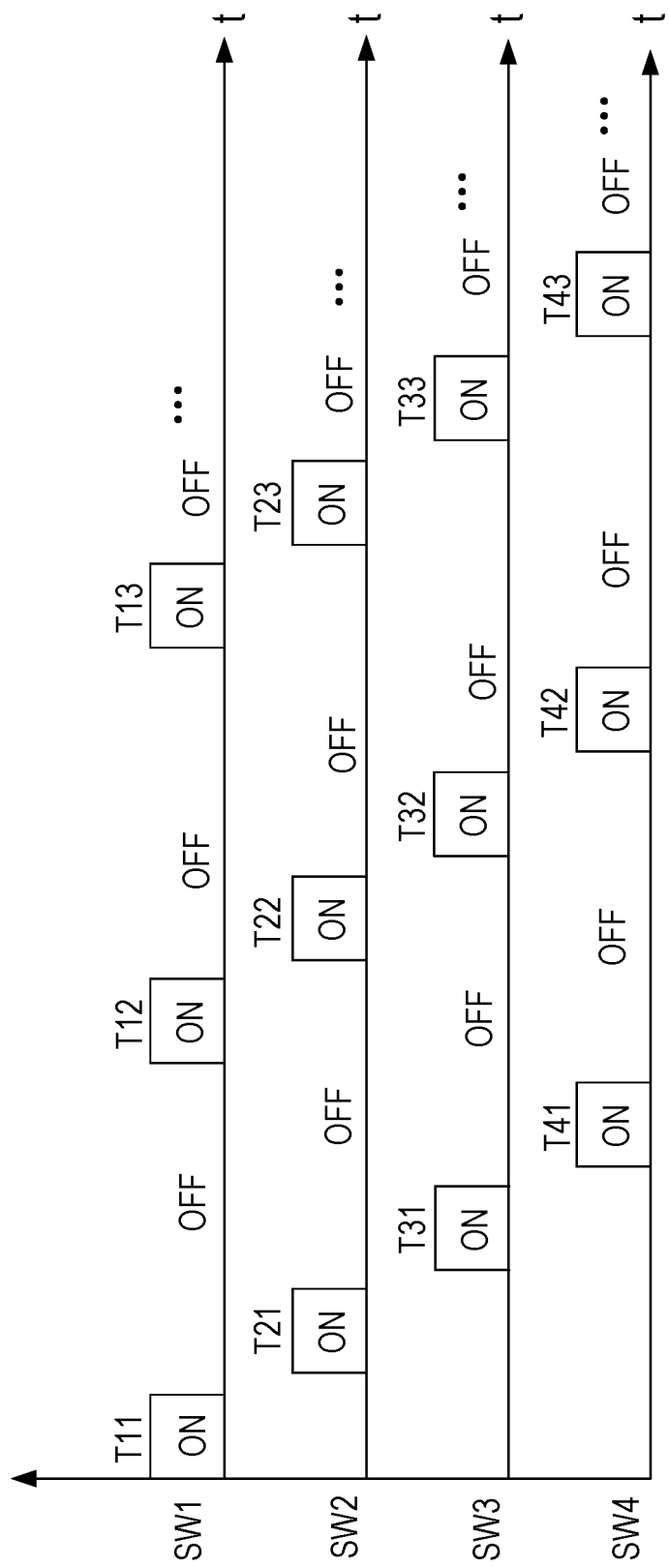
FIG. 3 shows a timing diagram of a controller for controlling a light source module, in accordance with embodiments of the present invention.

More specifically, the switching module 130 includes multiple switches SW1-SW4 that are coupled between the power input terminal PWIN and a corresponding power output terminal. For example, a first switch SW1 is coupled between the power input terminal PWIN and the first power output terminal PWO1, and a second switch SW2 is coupled between the power input terminal PWIN and the second power output terminal PWO2. Referring to FIG. 3, the controller 180 is operable for turning on the first switch SW1 in the first sequence of discrete time slots T11, T12, T13, turning on the second switch SW2 in the second sequence of discrete time slots T21, T22, T23, turning on the third switch SW3 in the third sequence of discrete time slots T31, T32, T33, and turning on the fourth switch SW4 in the fourth sequence of discrete time slots T41, T42, T43. The first, second, third and fourth sequences of discrete time slots are mutually exclusive (that is, they cannot happen simultaneously; they do not overlap) and are interleaved as shown in the example of FIG. 3.

With reference back to FIG. 1, the current sensing terminals ISEN1-ISEN8 are coupled to the LED arrays A1-A4 for sensing a level of a current of each LED string in the LED arrays A1-A4 in the manner described below. The current regulation module 150 is coupled to the LED arrays A1-A4 via the sensing terminals ISEN1-ISEN8 and is operable for linearly regulating the current of each LED string in the LED arrays A1-A4, as described further below in the discussion of FIG. 2.

Continuing with reference to FIG. 1, the feedback control module 140 is operable for generating a feedback signal FB based on a power requirement of the light source module to control the power converter 120, such that the electric power from the power converter can satisfy the power requirement of the light source module. The feedback signal FB is provided to the power converter 120 via the feedback terminal FBOUT. The feedback control module 140 is coupled to the current sensing terminals ISEN1-ISEN8 and generates the feedback signal FB based on the voltages at the current sensing terminals ISEN1-ISEN8. The voltages at the current sensing terminals ISEN1-ISEN8 can indicate a power requirement of the light source module. More specifically, the feedback control module 140 selects a minimum voltage among the voltages at the current sensing terminals ISEN1-ISEN8 and compares the minimum voltage with a predetermined voltage range to generate the feedback signal FB. The power converter 120, under control of the feedback signal FB, increases or decreases the electric power such that the minimum voltage is within the predetermined voltage range.

The decoding module 160 is operable for receiving a timing signal from a timing controller 190 (e.g., a Micro Controlling Unit) and for generating a switching signal to control the switches SW1-SW4 in the switching module 130 based on the timing signal. The decoding module 160 is further operable for generating multiple control signals to control the current regulation module 150. Accordingly, multiple current regulation units (shown in FIG. 2) can be independently enabled and disabled by a corresponding control signal. The decoding module 160 can communicate with the timing controller through, for example, a Serial Peripheral Interface (SPI).

The LED arrays A1-A4 are configured to receive electric power from power output terminals PWO1-PWO4, respectively, and share the current sensing terminals ISEN1-ISEN8. More specifically, the anodes of the LED strings in the first LED array A1 are connected to a common node N1, and the common node N1 is connected to the first power output terminal PWO1. The anodes of the LED strings in the second LED array A2 are connected to a common node N2, and the common node N2 is connected to the second power output terminal PWO2. The anodes of the LED strings in the third LED array A3 are connected to a common node N3, and the common node N3 is connected to the third power output terminal PWO3. The anodes of the LED strings in the fourth LED array A4 are connected to a common node N4, and the common node N4 is connected to the fourth power output terminal PWO4.

On the other hand, the cathode of a first LED string in the first LED array A1, the cathode of a first LED string in the second LED array A2, the cathode of a first LED string in the third LED array A3 and the cathode of a first LED string in the fourth LED array A4 are connected to a first common node NC1. The common node NC1 is connected to a current sensing terminal ISEN1. Thus, the current sensing terminal ISEN1 senses the current on each of the first LED strings in each of the LED arrays. Similarly, the cathodes of each of the second LED strings in each LED array are connected to a second common node NC2 (not shown), which is connected to a current sensing terminal ISEN2 (not shown), and so on. The cathodes of each of the last (e.g., eighth) LED strings in each LED array are connected to the respective (e.g., eighth) common node NC8, which is connected to a current sensing terminal ISEN8.

In operation, if the switch SW1 is turned on, then a current flows through the first power output terminal PWO1, the common node N1 to the first LED array A1, and then back to the controller 180 through the common nodes NC1-NC8 and the current sensing terminals ISEN1-ISEN8. If the switch SW2 is turned on, then a current flows through the second power output terminal PWO2, the common node N2 to the second LED array A2, and then back to the controller 180 through the common nodes NC1-NC8 and the current sensing terminals ISEN1-ISEN8. As such, the configuration of the controller 180 and the structure of the circuit 100 allow the LED arrays A1-A4 to share the same group of current sensing terminals ISEN1-ISEN8.

Figure 2:
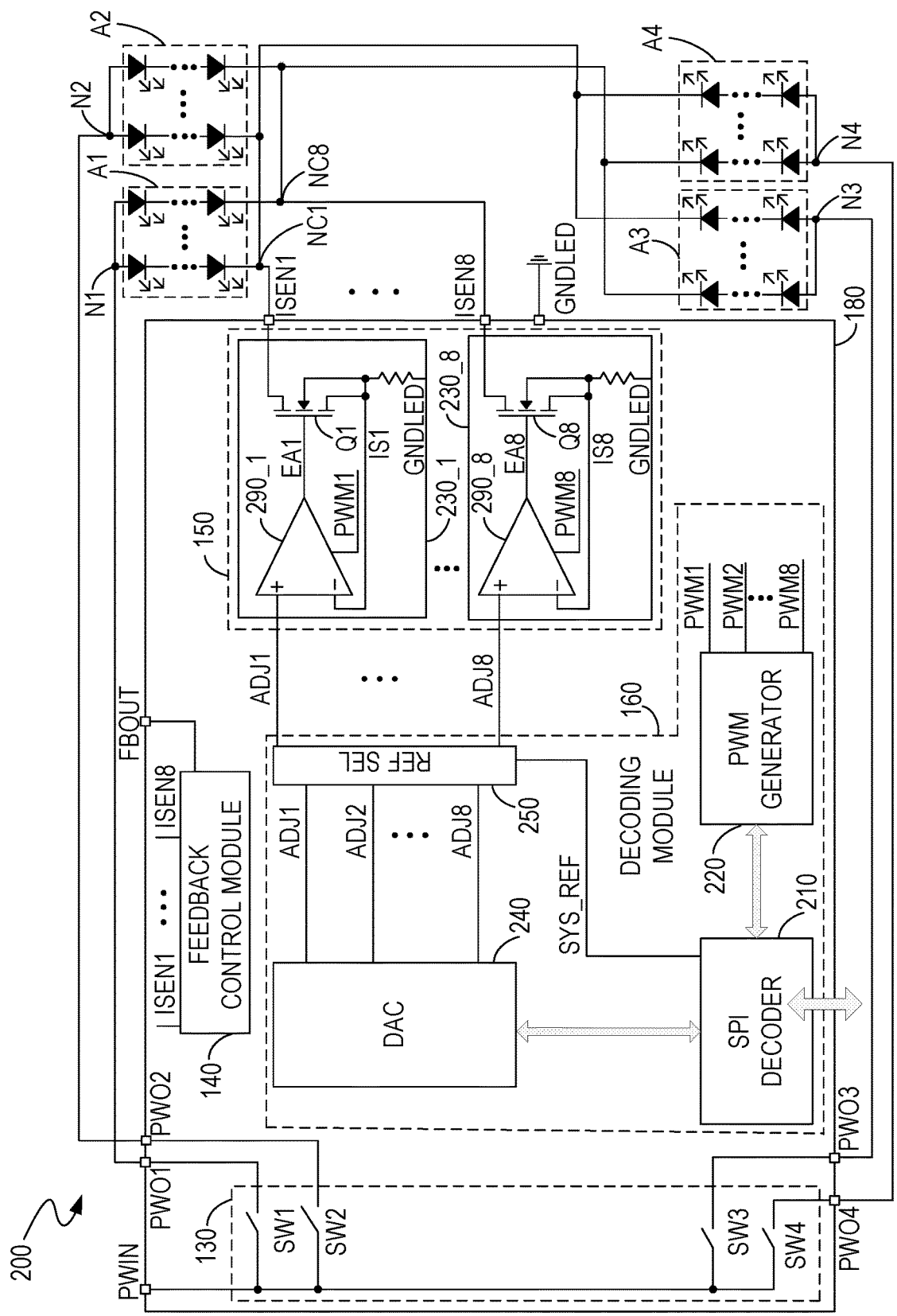
FIG. 2 shows a light source driving circuit including a controller for controlling a light source module, in accordance with embodiments of the present invention.

FIG. 2 shows a light source driving circuit 200 including a controller 180 for controlling a light source module, in accordance with embodiments of the present invention. FIG. 2 shows a detailed view of the internal structure of the controller 180. The controller 180 includes a switching module 130, a feedback control module 140, a current regulation module 150 and a decoding module 160.

The current regulation module 150 includes multiple current regulation units 230_1-230_8 coupled to the current sensing terminals ISEN1-ISEN8, respectively. The current regulation units 230_1-230_8 are operable for linearly regulating current of each LED string in the LED arrays A1-A4, and each current regulation unit is independently and individually enabled and disabled by a corresponding control signal of control signals PWM1-PWM8. The control signals PWM1-PWM8 can be Pulse Width Modulation (PWM) signals.

More specifically, each current regulation unit 230_1-230_8 includes a respective amplifier 290_1-290_8 coupled to a respective switch Q1-Q8. Each switch Q1-Q8 is in coupled in series with a corresponding LED string. Each current regulation unit has a similar configuration. Take current regulation unit 230_1 as an example. A non-inverting input of the amplifier 290_1 receives a reference signal ADJ1 indicative of a target current. An inverting input of the amplifier 290_1 receives a sensing signal IS1 indicative of a level of a current through the corresponding LED string. The amplifier 290_1 compares the reference signal ADJ1 with the sensing signal IS1 to generate an error signal EA1, and linearly controls the switch Q1 with the error signal EA1 so as to regulate the current of the corresponding LED string so that current is at the target current. The switch Q1 is controlled linearly means that, instead of either being fully turned on or fully turned off, the switch Q1 can be partially turned on such that a level of the current flowing through the switch Q1 can be continuously (non-discretely) and gradually adjusted.

The amplifier 290_1 is controlled by a control signal PWM1. If the control signal PWM1 is in a first state (e.g., logic high), then the amplifier 290_1 is enabled and the corresponding LED string is turned on and regulated as described above. If the control signal PWM1 is in a second state (e.g., logic low), then the amplifier 290_1 is disabled and the corresponding LED string is turned off.

In an embodiment, the decoding module 160 includes a SPI decoder 210, a PWM generator 220, a digital-analog convertor (DAC) 240, and a reference selection unit 250. The SPI decoder 210 receives a timing signal from a timing controller (not shown) and decodes the timing signal. The PWM generator 220 is coupled to the SPI decoder 210 and generates the control signals PWM1-PWM8 based on the timing signal. The DAC 240 is coupled to the SPI decoder and generates reference signals ADJ1-ADJ8. The reference selection unit 250 selects either the reference signals ADJ1-ADJ8 or a system reference signal SYS_REF that is also generated from the SPI decoder 210, and supplies the selected signal(s) (e.g., ADJ1-ADJ8 or SYS_REF) to the respective amplifier 290_1-290_8. That is, either the non-inverting input of the amplifier 290_1 receives the signal ADJ1, the non-inverting input of the amplifier 290_2 receives the signal ADJ2, and so on, or the non-inverting inputs of the amplifiers 290_1-290_8 all receive the signal SYS_REF. Furthermore, the decoding module 160 processes the timing signal and provides a switching signal to the switching module 130. The switching module 130 controls the switches SW1-SW4 with the switching signal to turn on the switches SW1-SW4 in four sequences of discrete time slots that are mutually exclusive.

As described above, the present invention includes a controller for controlling a light source module. The controller is operable for alternately delivering electric power to multiple LED arrays (e.g., first to one LED array, then to another LED array, and so on, one LED array at a time), and for regulating the current of each LED string in the LED arrays. The controller enables the LED arrays to share a same group of current sensing terminals of the controller. Advantageously, multiple LED arrays can be controlled by a single controller, and thus the cost of the system is reduced. Moreover, each LED string in the LED arrays can be independently and individually regulated or disabled, which allows flexible and fine (accurate or precise) levels of dimming in a display system.

Figure 4:
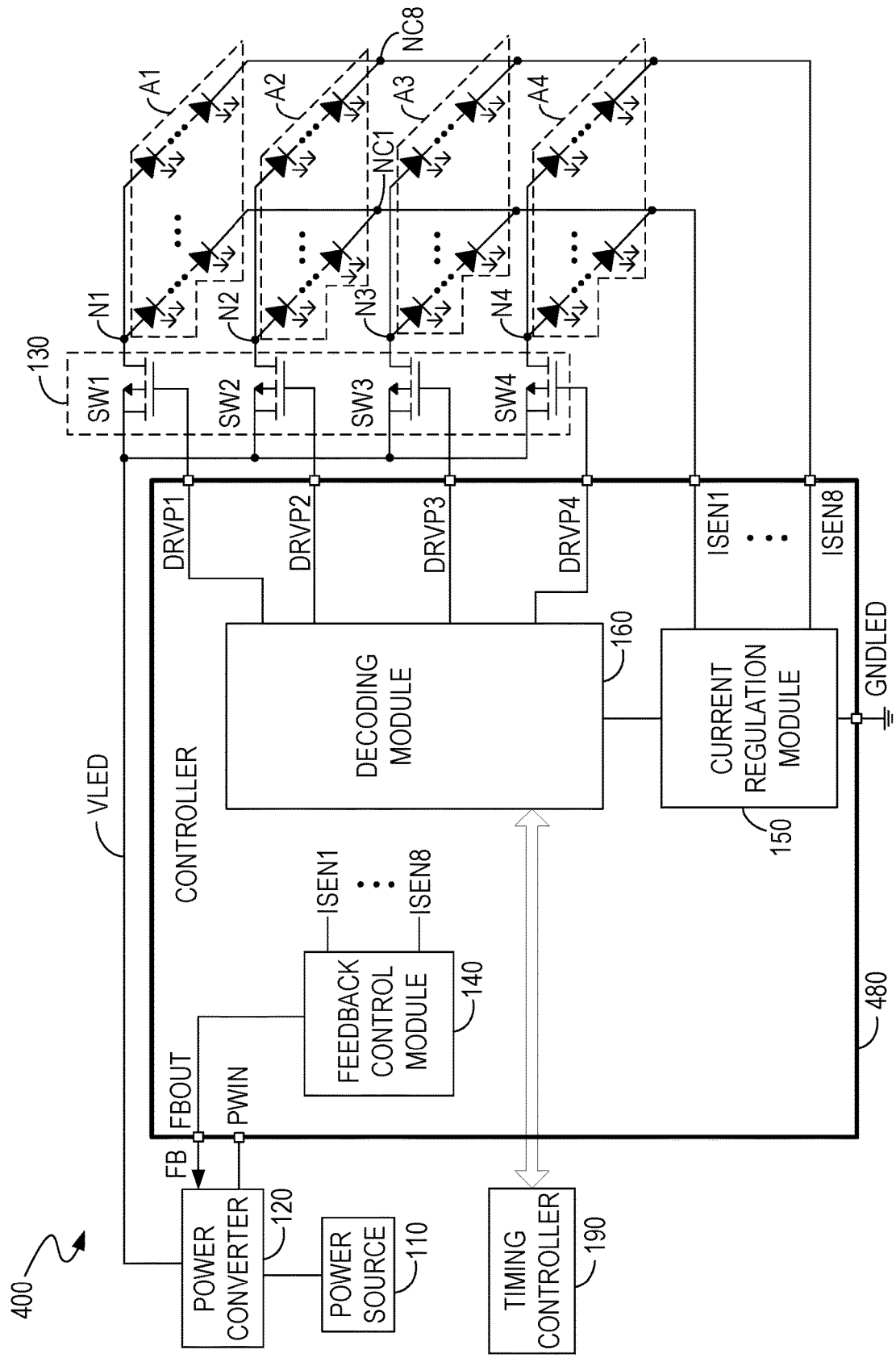
FIG. 4 shows a light source driving circuit including a controller for controlling a light source module, in accordance with embodiments of the present invention.

FIG. 4 shows a light source driving circuit 400 including a controller 480 for controlling a light source module, in accordance with embodiments of the present invention. Elements labeled the same as in FIG. 1 have similar functions. FIG. 4 is described in conjunction with FIG. 1. The main difference between the embodiments of FIG. 4 and FIG. 1 is that the switching module 130 in FIG. 1 is inside of the controller 180 while the switching module 130 in FIG. 4 is located outside of the controller 480. The controller 480 is coupled to the switches SW1-SW4 through driving terminals DRVP1-DRVP4, respectively. The switch SW1 is coupled between the power converter 120 and the first LED array A1. The switch SW2 is coupled between the power converter 120 and the second LED array A2. The switch SW3 is coupled between the power converter 120 and the third LED array A3. The switch SW4 is coupled between the power converter 120 and the fourth LED array A4. Current sensing terminals ISEN1-ISEN8 are coupled to the LED arrays A1-A4 for sensing a level of a current of each LED string in the LED arrays A1-A4. The anodes of the LED strings in the first LED array A1 are connected to a common node N1, and the common node N1 is connected to the switch SW1. The anodes of the LED strings in the second LED array A2 are connected to a common node N2, and the common node N2 is connected to the switch SW2. The anodes of the LED strings in the third LED array A3 are connected to a common node N3, and the common node N3 is connected to the switch SW3. The anodes of the LED strings in the fourth LED array A4 are connected to a common node N4, and the common node N4 is connected to the switch SW4. The cathode of a first LED string in the first LED array A1, the cathode of a first LED string in the second LED array A2, the cathode of a first LED string in the third LED array A3, and the cathode of a first LED string in the fourth LED array A4 are connected to a first common node NC1. The common node NC1 is connected to the current sensing terminal ISEN1. Thus, the current sensing terminal ISEN1 senses the current on each of the first LED strings in each of the LED arrays. Similarly, the cathodes of each of the second LED strings in each LED array are connected to a second common node NC2 (not shown), which is connected to a current sensing terminal ISEN2 (not shown), and so on. The cathodes of each of the last (e.g., eighth) LED strings in each LED array are connected to the respective (e.g., eighth) common node NCB, which is connected to a current sensing terminal ISEN8.

The controller 480 is operable for: turning on the first switch SW1 by the first driving terminal DRVP1 in the first sequence of discrete time slots T11, T12, T13 to deliver electric power from the power converter 120 to the first LED array A1; turning on the second switch SW2 by the second driving terminal DRVP2 in the second sequence of discrete time slots T21, T22, T23 to deliver electric power from the power converter 120 to the second LED array A2; turning on the third switch SW3 by the third driving terminal DRVP3 in the third sequence of discrete time slots T31, T32, T33 to deliver electric power from the power converter 120 to the third LED array A3; and turning on the fourth switch SW4 by the fourth driving terminal DRVP4 in the fourth sequence of discrete time slots T41, T42, T43 to deliver electric power from the power converter 120 to the fourth LED array A4. The first, second, third, and fourth sequences of discrete time slots are mutually exclusive and are interleaved as shown in the example of FIG. 3. More specifically, the decoding module 160 is operable for receiving a timing signal from a timing controller and for generating a switching signal to control the switches SW1-SW4 as described above.

Because the switches SW1-SW4 are usually implemented by metal-oxide semiconductor (MOS) transistors that include parasitic capacitors, when an LED string (e.g., the first LED string in the first LED array A1 intended to be off by turning off the switch SW1), a spike current can flow through the parasitic capacitor of the switch SW1 and through the switch Q1 (in the current regulation module 150, shown in FIG. 2) to ground if Q1 is on. Such a spike current can turn on the first LED string briefly. If the light source driving circuit 400 is used for back lighting of a display device such as a TV or a computer monitor, this will cause an undesirable residual image on the screen of the display device. To solve this problem, various embodiments according to present invention are disclosed in FIG. 5 to FIG. 24.

Figure 5:
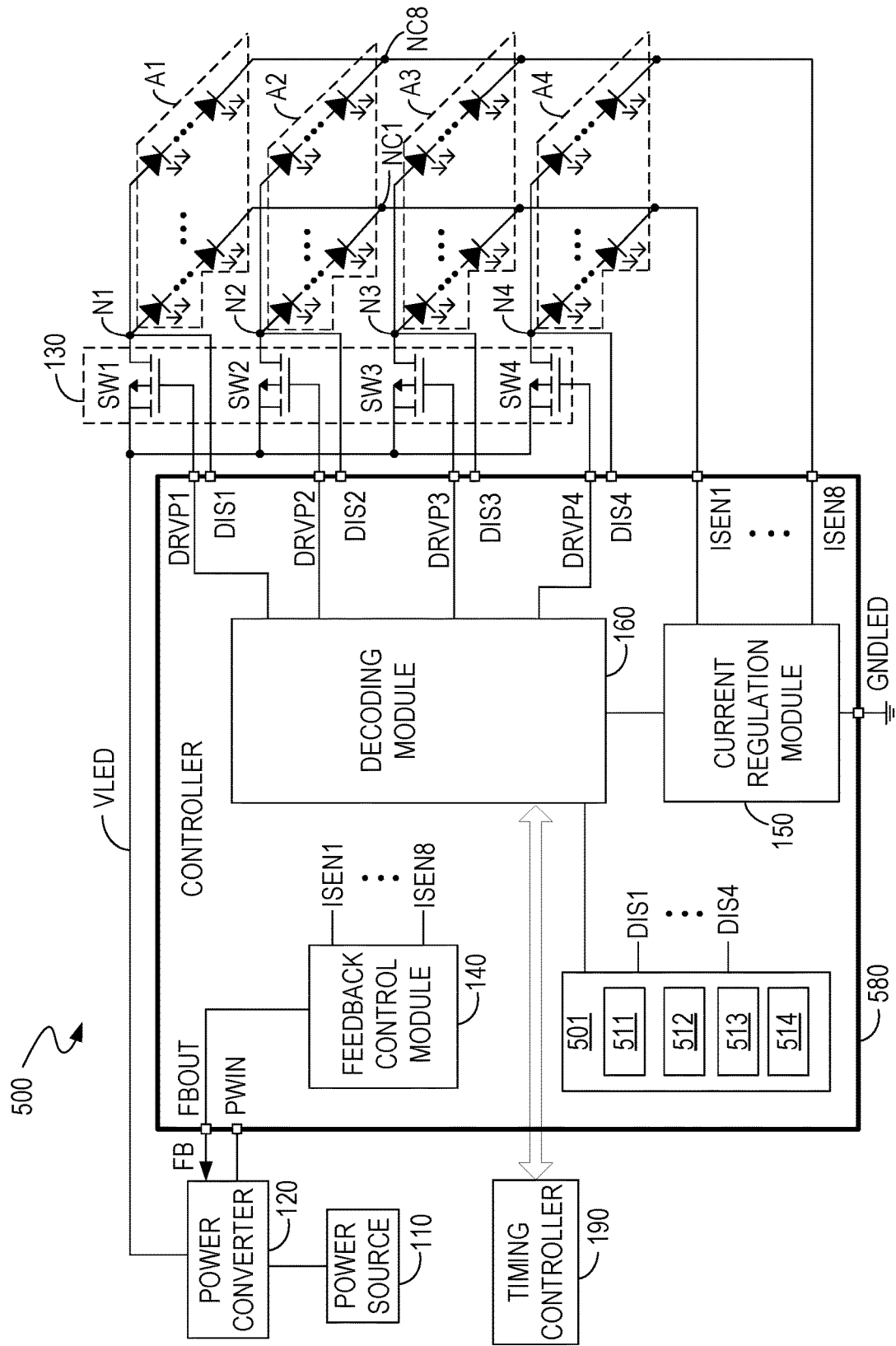
FIG. 5 shows a light source driving circuit including a controller for controlling a light source module, in accordance with embodiments of the present invention.

FIG. 5 shows a light source driving circuit 500 including a controller 580 for controlling a light source module, in accordance with embodiments of the present invention. Elements labeled the same as in FIG. 4 have similar functions. In the example of FIG. 5, the controller 580 includes multiple discharging terminals DIS1-DIS4, each coupled to anodes of the LED strings in a corresponding LED array. For example, the discharging terminal DIS1 is coupled to anodes of the LED strings in the first LED array A1 (i.e., the common node N1). The discharging terminal DIS2 is coupled to anodes of the LED strings in the second LED array A2 (i.e., the common node N2), and so on. The controller 580 includes a residual image cancelation module 501, coupled to the decoding module 160, and operable for regulating a voltage across each LED string in each LED array to below a threshold, referred to herein as the turn-on threshold. The turn-on threshold is set such that none of the LED strings are turned on because of the spike current. The residual image cancelation module 501 includes multiple voltage regulation units 511-514. Each of the regulation units 511-514 can be individually enabled or disabled by a corresponding enable signal. For example, the regulation unit 511 can be controlled by an enable signal EN1. The enable signal EN1 can be generated by the decoding module 160 (shown in FIG. 5). The voltage regulation units 511-514 are coupled to the discharging terminals DIS1-DIS4. More specifically, the voltage regulation unit 511 is coupled to the first discharging terminal DIS1 and is operable for decreasing a voltage at an anode of a first LED string in the first LED array A1 to regulate a voltage across the first LED string in the first LED array A1 to below the threshold.

Figure 6:
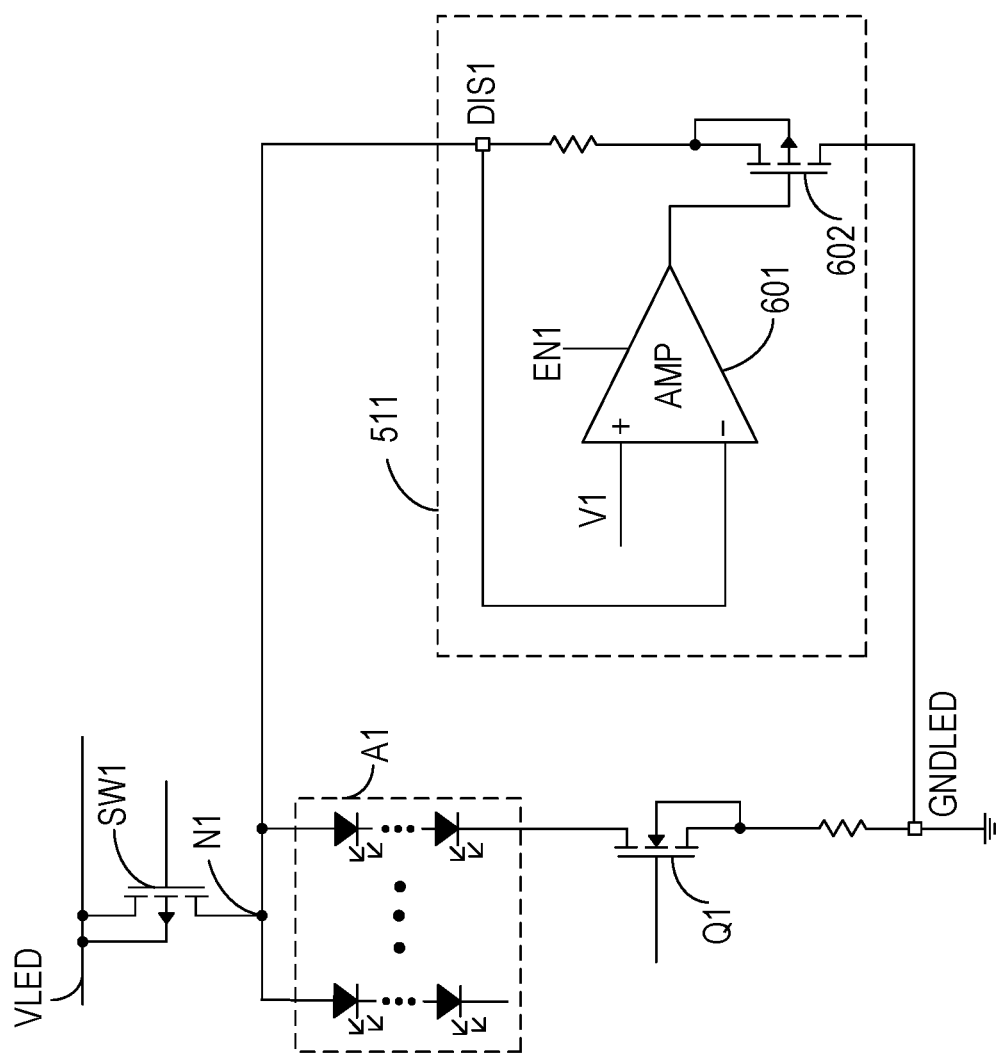
FIG. 6 shows a voltage regulation unit in a controller for controlling a light source module, in accordance with embodiments of the present invention.

FIG. 6 shows an example of the voltage regulation unit 511 in the controller 580, in accordance with embodiments of the present invention. In the example of FIG. 6, the voltage regulation unit 511 includes an amplifier 601 and a discharging switch 602. The discharging switch 602 is coupled between the discharging terminal DIS1 and ground. The amplifier 601 has a non-inverting input terminal that receives a first voltage signal V1, an inverting input terminal coupled to the discharging terminal DIS1, and an output terminal coupled to the discharging switch 602. When enabled by the enable signal EN1, the amplifier 601 regulates a voltage at the anode of the first LED string in the first LED array A1 to follow the first voltage signal V1, thereby decreasing a voltage across the first LED string in the first LED array A1 to below the turn-on threshold.

Figure 7:
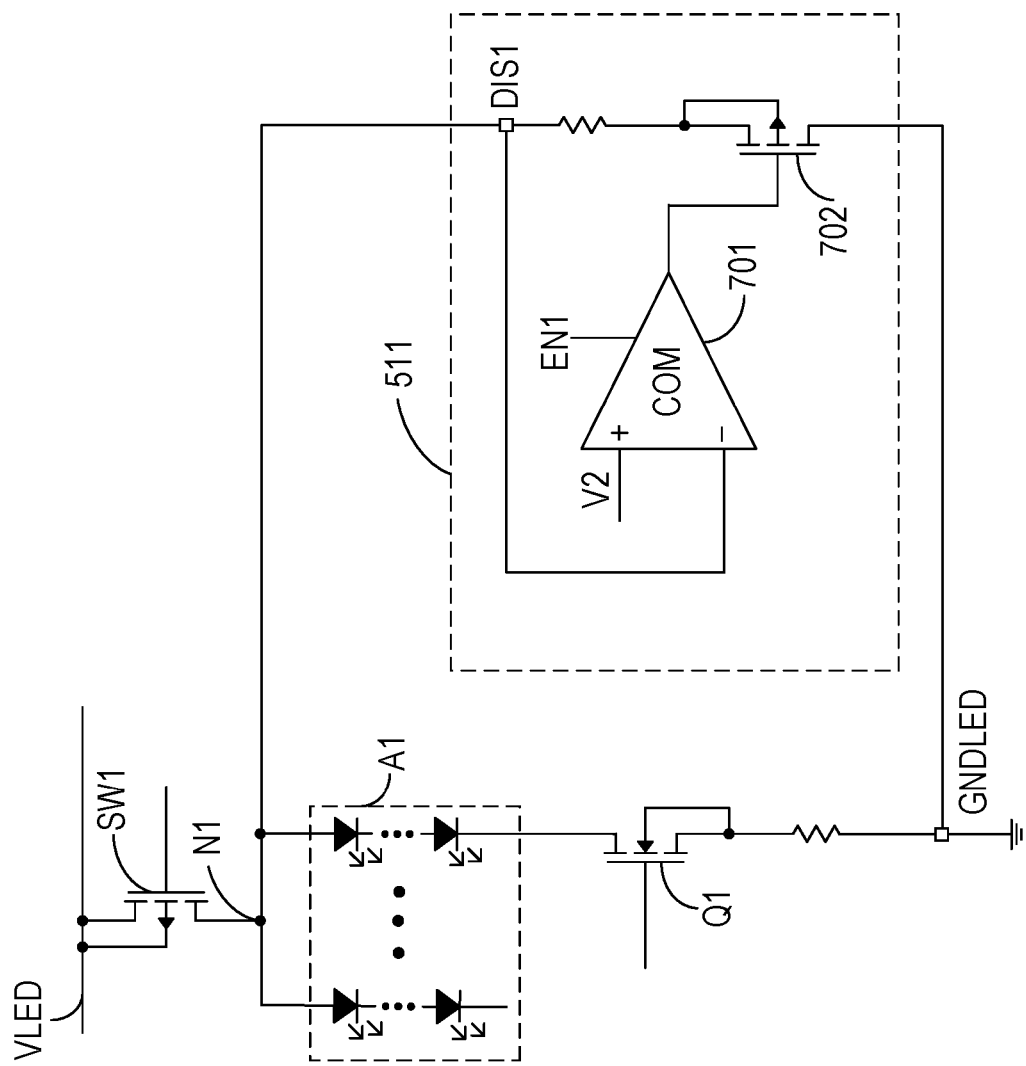
FIG. 7 shows a voltage regulation unit in a controller for controlling a light source module, in accordance with embodiments of the present invention.

FIG. 7 shows an example of the voltage regulation unit 511 in the controller 580, in accordance with embodiments of the present invention. In the example of FIG. 7, the voltage regulation unit 511 includes a comparator 701 and a discharging switch 702. The discharging switch 702 is coupled between the discharging terminal DIS1 and ground. The comparator 701 has a non-inverting input terminal that receives a second voltage signal V2, an inverting input terminal coupled to the discharging terminal DIS1, and an output terminal coupled to the discharging switch 702. When enabled by the enable signal EN1, the comparator 701 compares a voltage at the anode of the first LED string in the first LED array A1 with the second voltage signal V2. If the voltage at the anode of the first LED string in the first LED array A1 is greater than the second voltage signal V2, then the comparator 701 turns on the discharging switch 702 to enable a discharging current flowing from the anode of the first LED string of the first LED array A1 through the discharging switch 702 to ground, thereby decreasing a voltage across the first LED string in the first LED array A1 to below the turn-on threshold.

Figure 8:
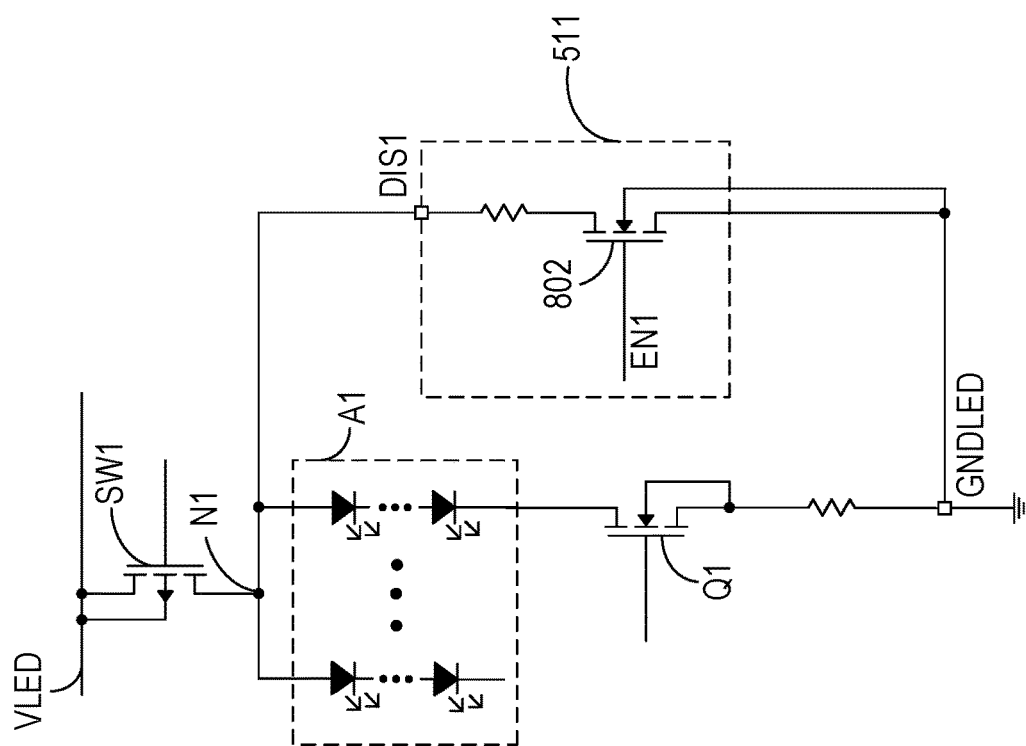
FIG. 8 shows a voltage regulation unit in a controller for controlling a light source module, in accordance with embodiments of the present invention.

FIG. 8 shows an example of the voltage regulation unit 511 in the controller 580, in accordance with embodiments of the present invention. In the example of FIG. 8, the voltage regulation unit 511 includes a discharging switch 802. The discharging switch 802 is coupled between the discharging terminal DIS1 and ground. When turned on by the enable signal EN1, the discharging switch 802 conducts a discharging current from the anode of the first LED string of the first LED array A1 to ground, thereby decreasing a voltage across the first LED string in the first LED array A1 to be below the turn-on threshold.

Figure 9:
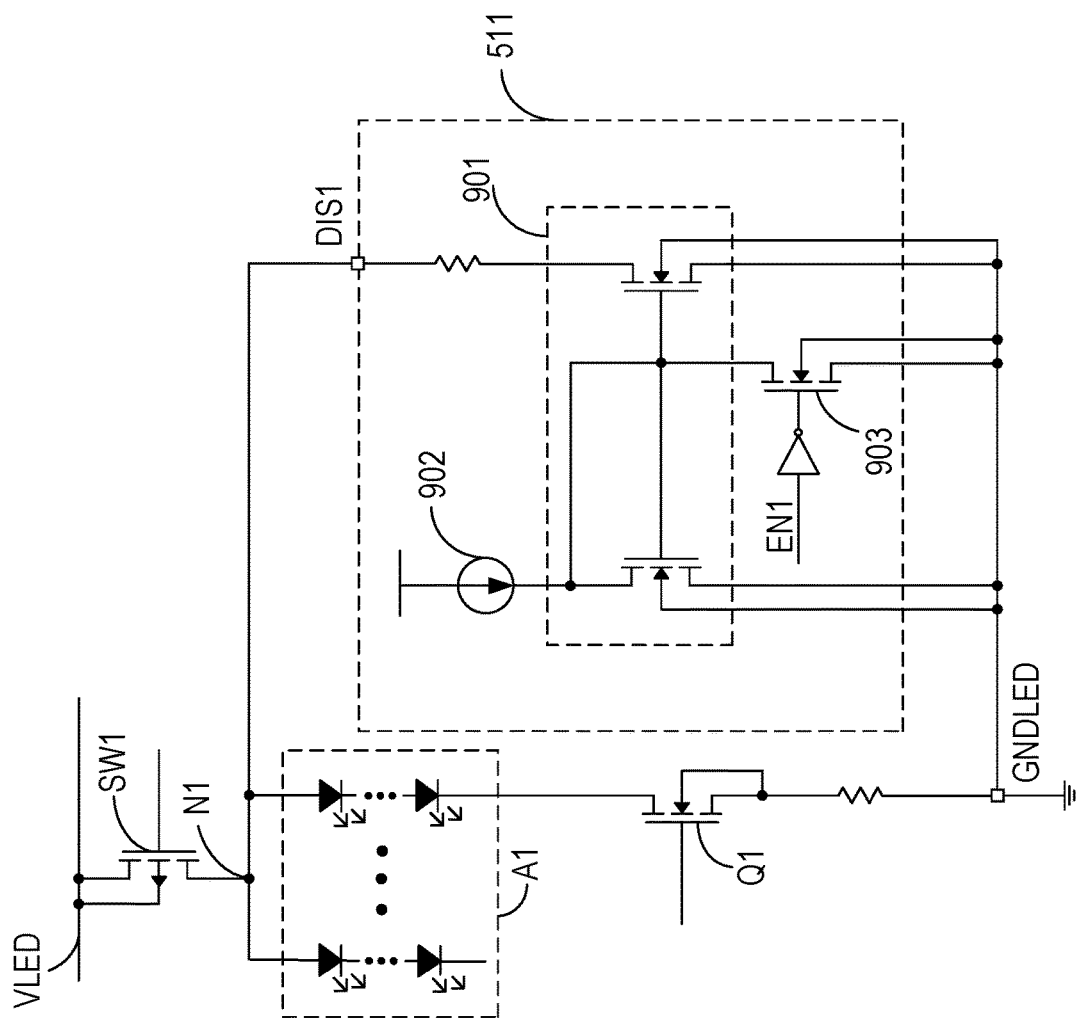
FIG. 9 shows a voltage regulation unit in a controller for controlling a light source module, in accordance with embodiments of the present invention.

FIG. 9 shows an example of the voltage regulation unit 511 in the controller 580, in accordance with embodiments of the present invention. In the example of FIG. 9, the voltage regulation unit 511 includes a current mirror 901 having a first branch coupled between the discharging terminal DIS1 and ground, and a second branch coupled between a current source 902 and ground. A switch 903 is coupled to the current mirror 901 for enabling or disabling the current mirror 901 according to the enable signal EN1. When enabled, the current mirror 901 conducts a discharging current from the anode of the first LED string of the first LED array A1 through its first branch to ground, thereby decreasing a voltage across the first LED string in the first LED array A1 to be below the turn-on threshold.

Figure 10:
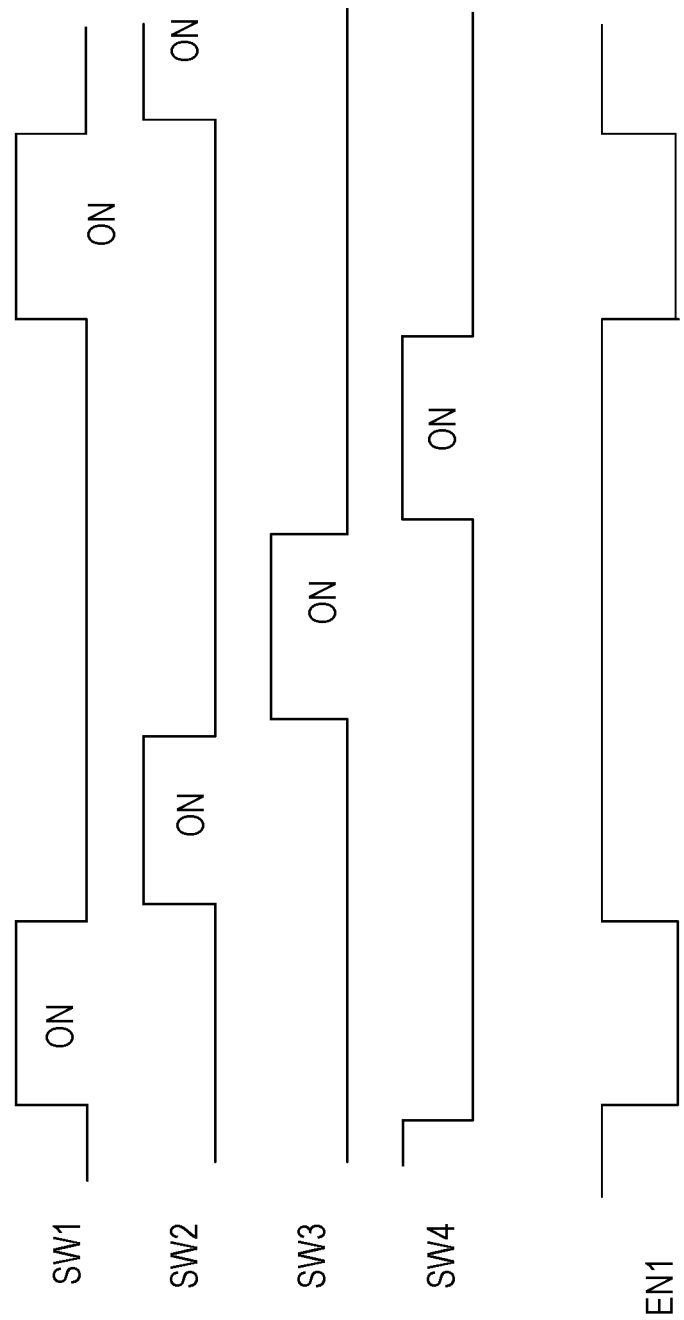
FIG. 10 shows a timing diagram of a controller for controlling a light source module, in accordance with embodiments of the present invention.
Figure 11:
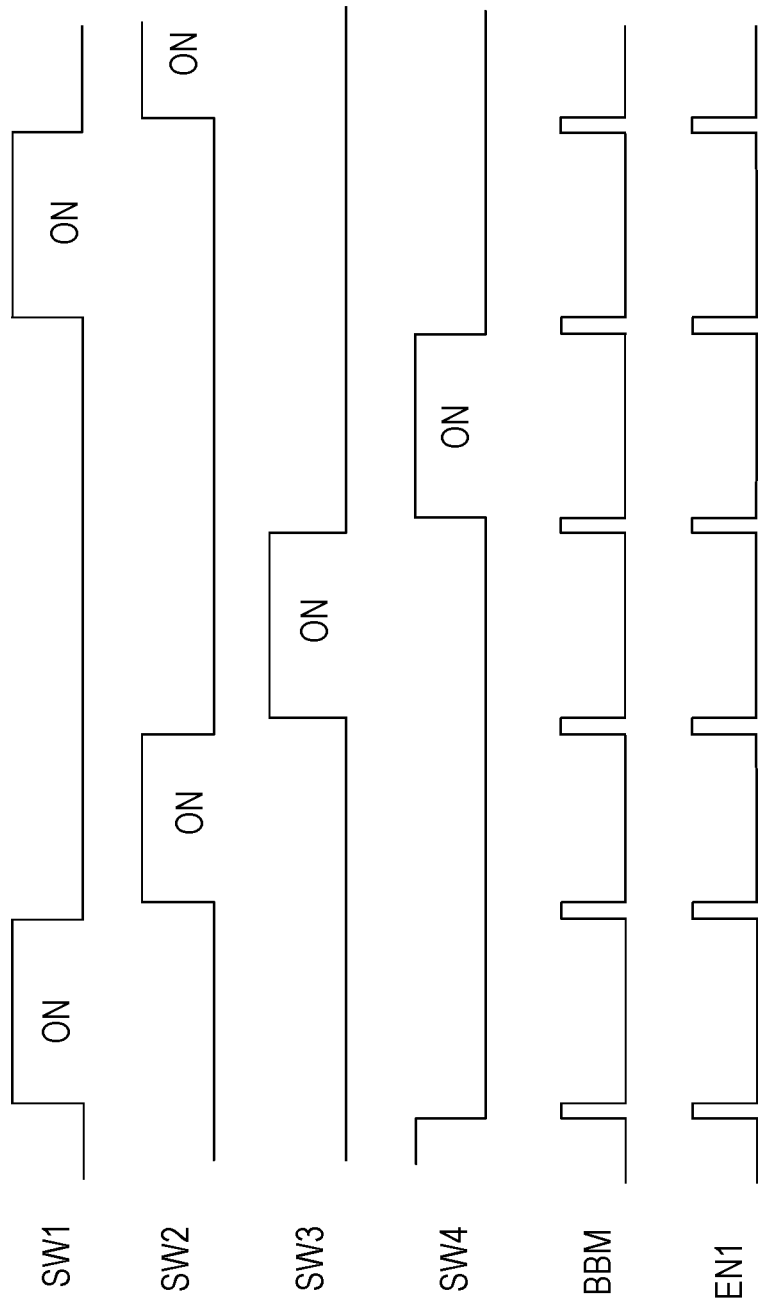
FIG. 11 shows a timing diagram of a controller for controlling a light source module, in accordance with embodiments of the present invention.

With reference back to FIG. 5, the voltage regulation unit 511 can be enabled when the enable signal EN1 is at a first level (e.g., logic high) or disabled when the enable signal EN1 is at a second level (e.g., logic low) according to different timing schemes. In an embodiment, the voltage regulation unit 511 can always be enabled. In another embodiment, as illustrated in FIG. 10, the voltage regulation unit 511 can be enabled when the first switch SW1 is off. In yet another embodiment, as illustrated in FIG. 11, the voltage regulation unit 511 can be enabled in a sequence of time intervals BBM. The sequence of time intervals BBM are intervals between the four sequences of discrete time slots in which the switches SW1-SW4 are mutually exclusively turned on. In other words, in each of the time intervals BBM, none of the switches SW1-SW4 are turned on and the voltage regulation unit 511 is enabled.

Figure 12:
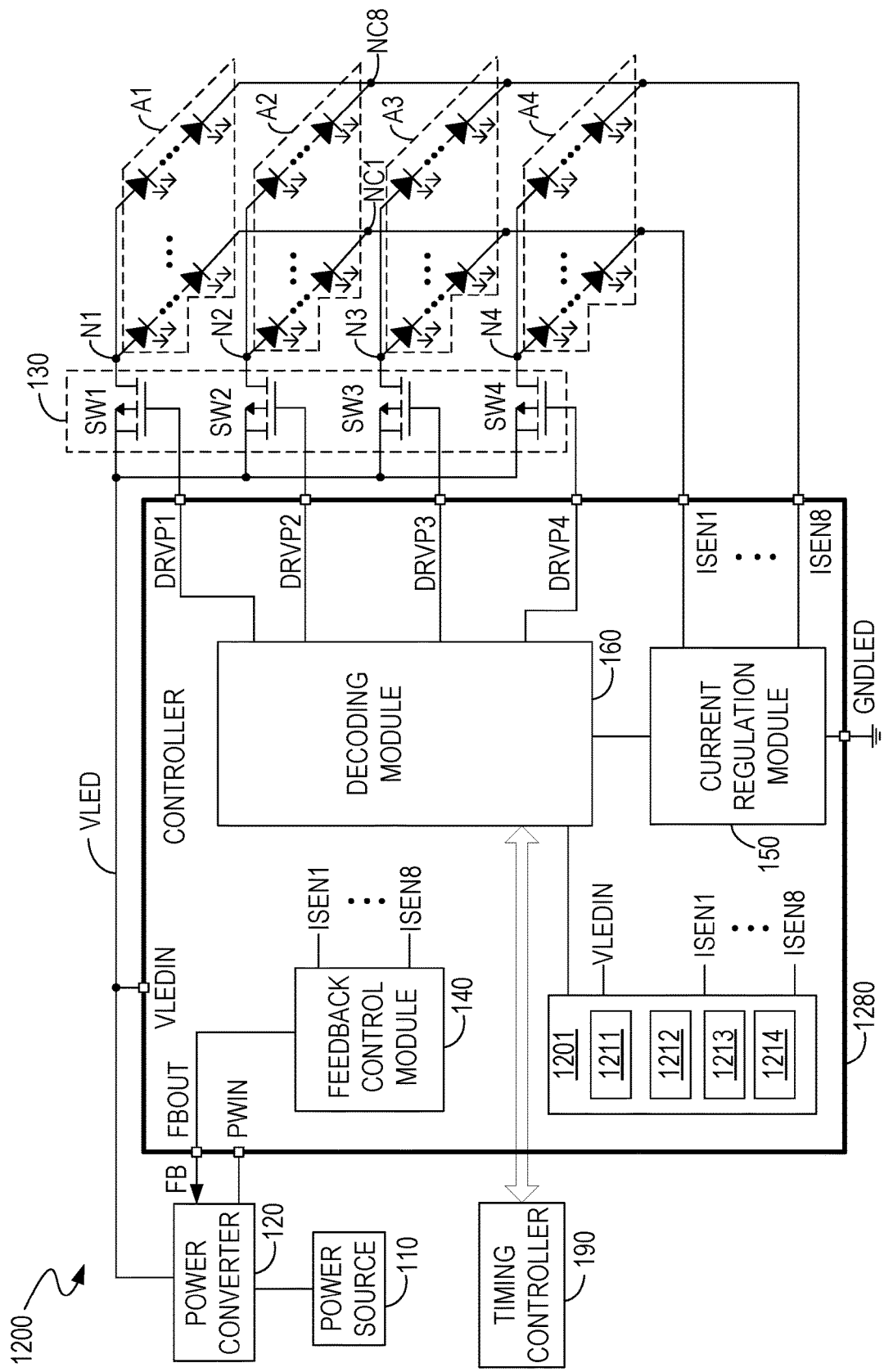
FIG. 12 shows a light source driving circuit including a controller for controlling a light source module, in accordance with embodiments of the present invention.

FIG. 12 shows a light source driving circuit 1200 including a controller 1280 for controlling a light source module, in accordance with embodiments of the present invention. Elements labeled the same as in FIG. 4 have similar functions. The controller 1280 includes a power terminal VLEDIN coupled to the power converter 120. The controller 1280 further includes a residual image cancelation module 1201, coupled to the decoding module 160, and operable for regulating a voltage across each LED string in each LED array to below a turn-on threshold. The turn-on threshold is set such that none of the LED strings are turned on because of the spike current. The residual image cancelation module 1201 includes multiple voltage regulation units 1211-1214. Each of the regulation units 1211-1214 can be individually enabled or disabled by a corresponding enable signal. For example, the regulation unit 1211 can be controlled by an enable signal EN1. The enable signal EN1 can be generated by the decoding module 160 (shown in FIG. 5). The voltage regulation units 1211-1214 are coupled to the power terminal VLEDIN and the current sensing terminals ISEN1-ISEN8. More specifically, the voltage regulation unit 1211 is coupled to the power terminal VLEDIN and the current sensing terminal ISEN1, and is operable for increasing a voltage at a cathode of the first LED string in the first LED array A1 to regulate a voltage across the first LED string in the first LED array A1 to below the threshold.

Figure 13:
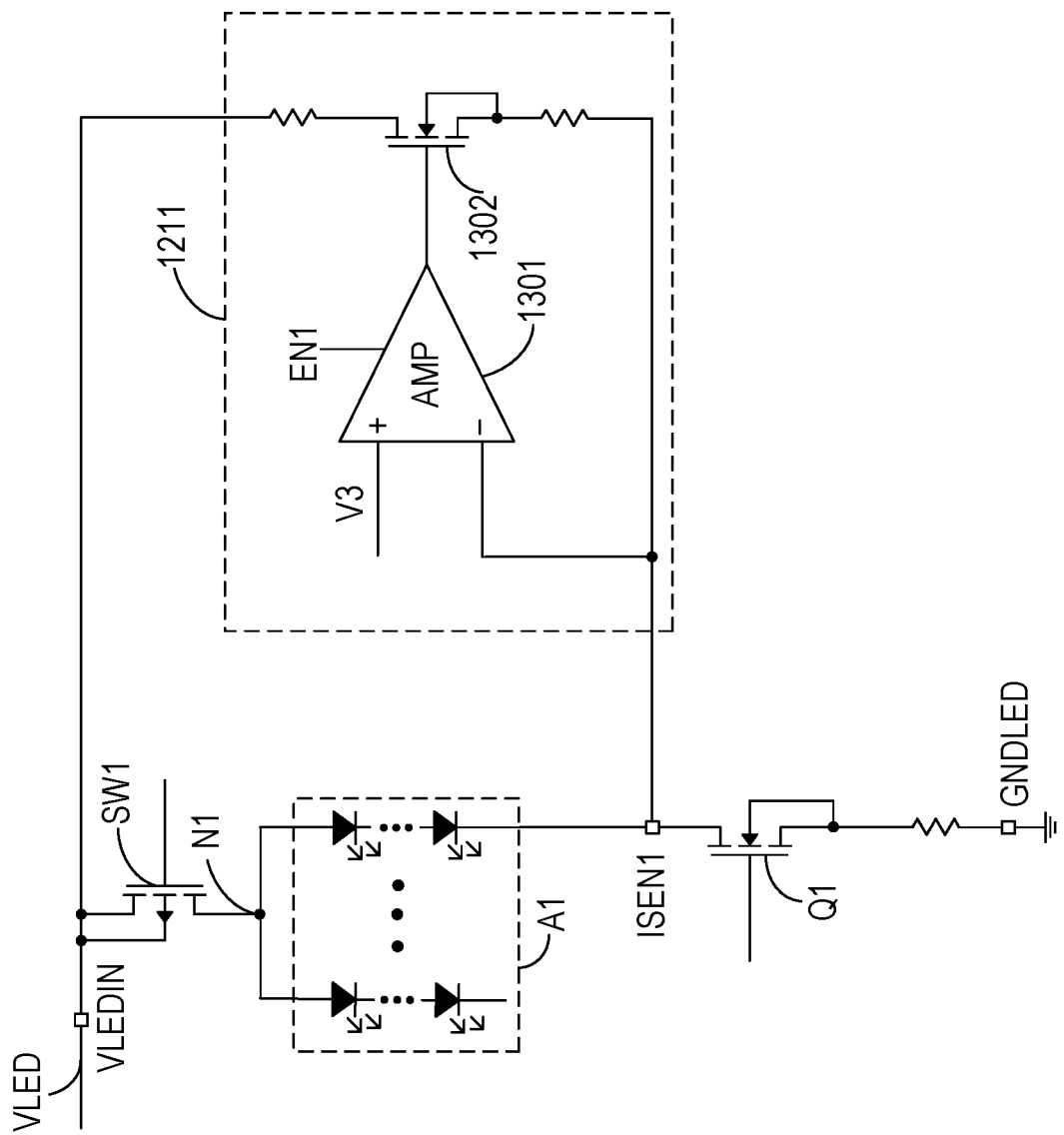
FIG. 13 shows a voltage regulation unit in a controller for controlling a light source module, in accordance with embodiments of the present invention.

FIG. 13 shows an example of the voltage regulation unit 1211 in the controller 1280, in accordance with embodiments of the present invention. In the example of FIG. 13, the voltage regulation unit 1211 includes an amplifier 1301 and a charging switch 1302. The charging switch 1302 is coupled between the power terminal VLEDIN and the current sensing terminal ISEN1. The amplifier 1301 has a non-inverting input terminal that receives a third voltage signal V3, an inverting input terminal coupled to the current sensing terminal ISEN1, and an output terminal coupled to the charging switch 1302. When enabled by the enable signal EN1, the amplifier 1301 regulates a voltage at the cathode of the first LED string in the first LED array A1 to follow the third voltage signal V3, thereby decreasing a voltage across the first LED string in the first LED array A1 to below the turn-on threshold.

Figure 14:
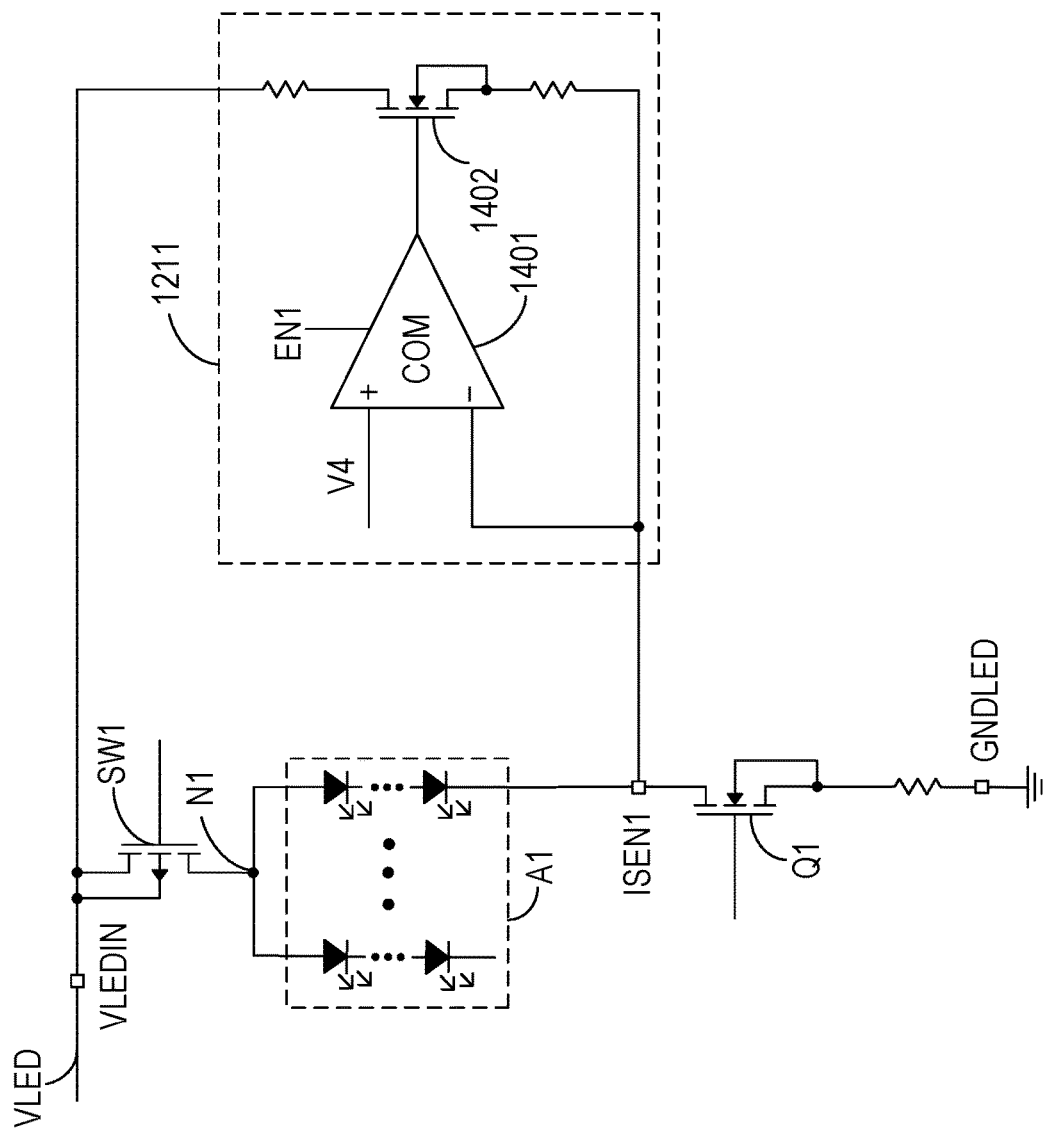
FIG. 14 shows a voltage regulation unit in a controller for controlling a light source module, in accordance with embodiments of the present invention.

FIG. 14 shows an example of the voltage regulation unit 1211 in the controller 1280, in accordance with embodiments of the present invention. In the example of FIG. 14, the voltage regulation unit 1211 includes a comparator 1401 and a charging switch 1402. The charging switch 1402 is coupled between the power terminal VLEDIN and the current sensing terminal ISEN1. The comparator 1401 has a non-inverting input terminal receiving a fourth voltage signal V4, an inverting input terminal coupled to the current sensing terminal ISEN1, and an output terminal coupled to the charging switch 1402. When enabled by the enable signal EN1, the comparator 1401 compares a voltage at the cathode of the first LED string in the first LED array A1 with the fourth voltage signal V4. If the voltage at the cathode of the first LED string in the first LED array A1 is less than the fourth voltage signal V4, then the comparator 701 turns on the charging switch 1402 to enable a charging current flowing from the power terminal VLEDIN through the charging switch 1402 to the cathode of the first LED string in the first LED array A1, thereby decreasing a voltage across the first LED string in the first LED array A1 to be below the turn-on threshold.

Figure 15:
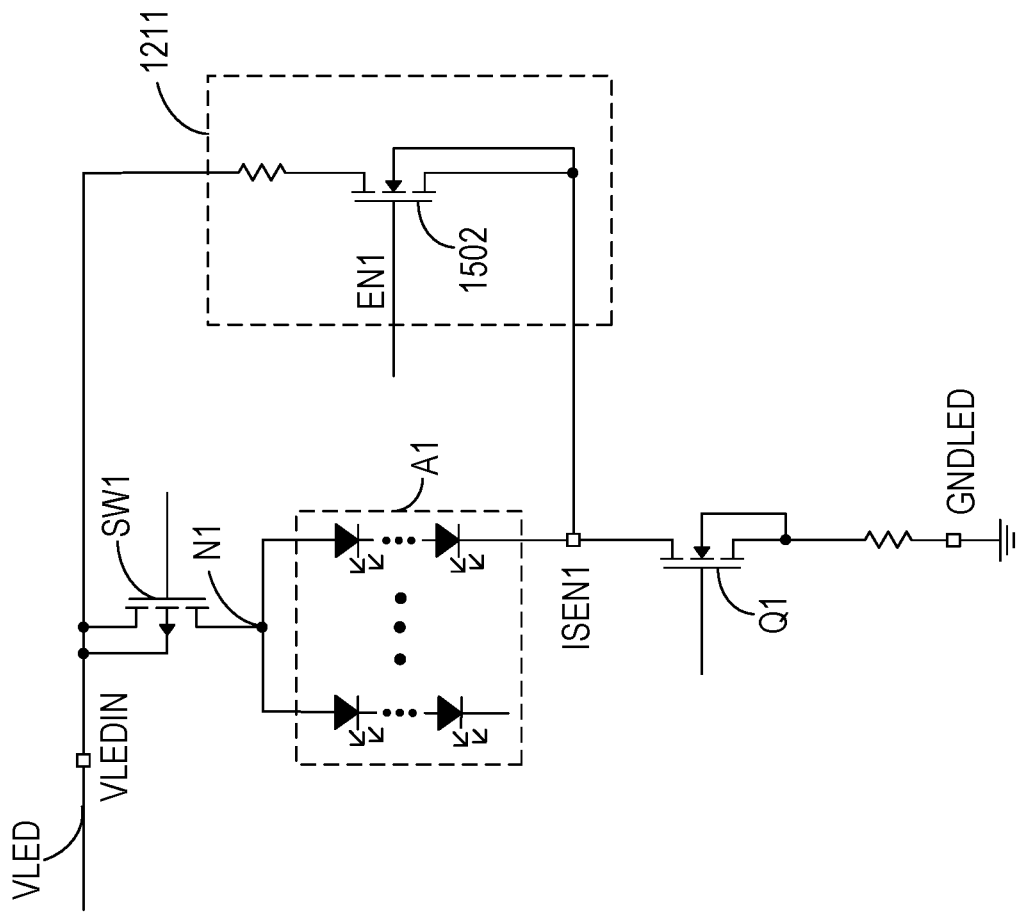
FIG. 15 shows a voltage regulation unit in a controller for controlling a light source module, in accordance with embodiments of the present invention.

FIG. 15 shows an example of the voltage regulation unit 1211 in the controller 1208, in accordance with embodiments of the present invention. In the example of FIG. 15, the voltage regulation unit 1211 includes a charging switch 1502. The charging switch 1502 is coupled between the power terminal VLEDIN and the current sensing terminal ISEN1. When turned on by the enable signal EN1, the charging switch 1502 conducts a charging current from the power terminal VLEDIN to the cathode of the first LED string of the first LED array A1, thereby decreasing a voltage across the first LED string in the first LED array A1 to below the turn-on threshold.

Figure 16:
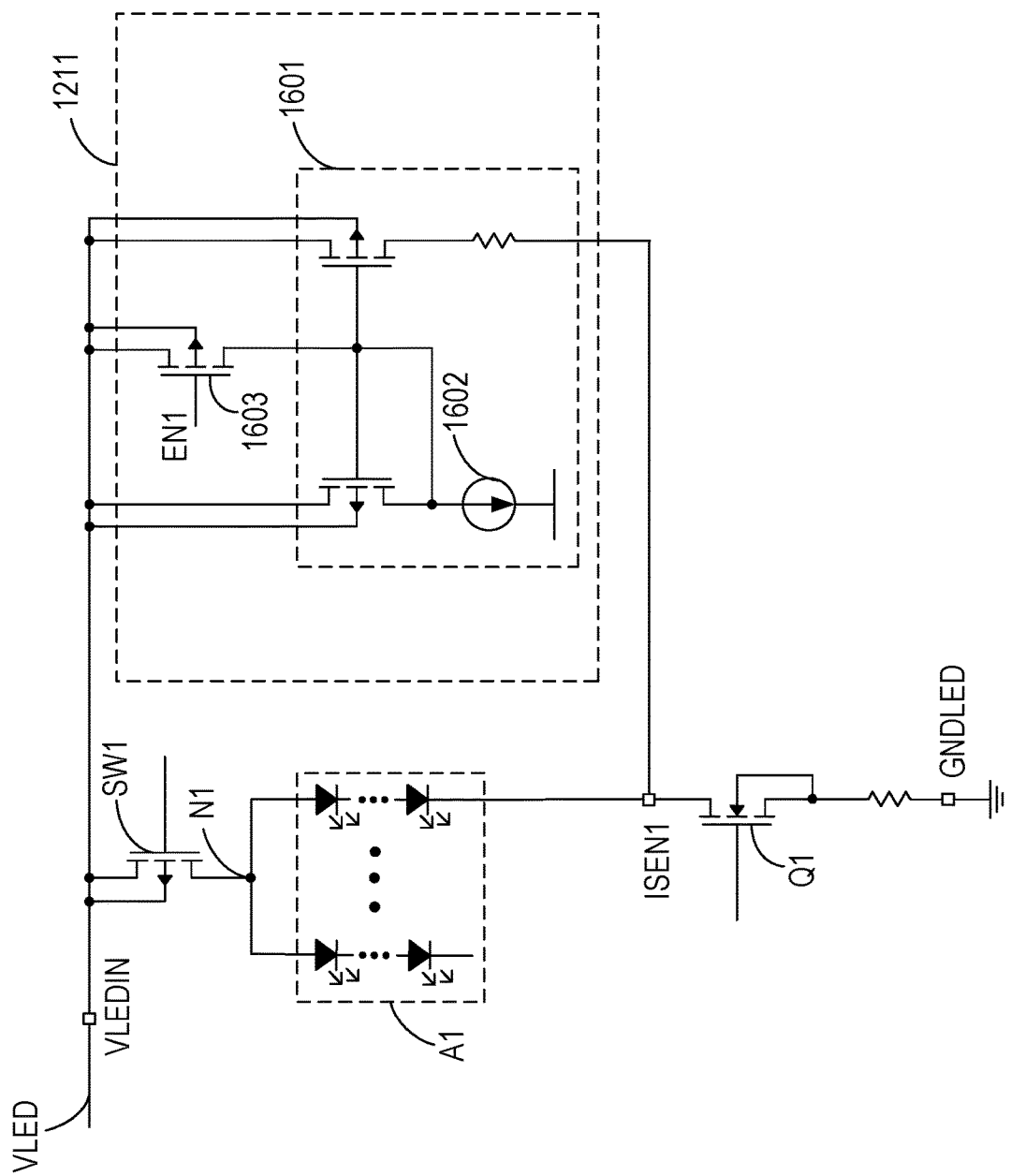
FIG. 16 shows a voltage regulation unit in a controller for controlling a light source module, in accordance with embodiments of the present invention.

FIG. 16 shows an example of the voltage regulation unit 1211 in the controller 1280, in accordance with embodiments of the present invention. In the example of FIG. 16, the voltage regulation unit 1211 includes a current mirror 1601 having a first branch coupled between the power terminal VLEDIN and the current sensing terminal ISEN1, and a second branch coupled between the power terminal VLEDIN and a current source 1602. A switch 1603 is coupled to the current mirror 1601 for enabling or disabling the current mirror 1601 according to the enable signal EN1. When enabled, the current mirror 1601 conducts a charging current from the power terminal VLEDIN through its first branch to the cathode of the first LED string of the first LED array A1, thereby decreasing a voltage across the first LED string in the first LED array A1 to below the turn-on threshold.

Figure 17:
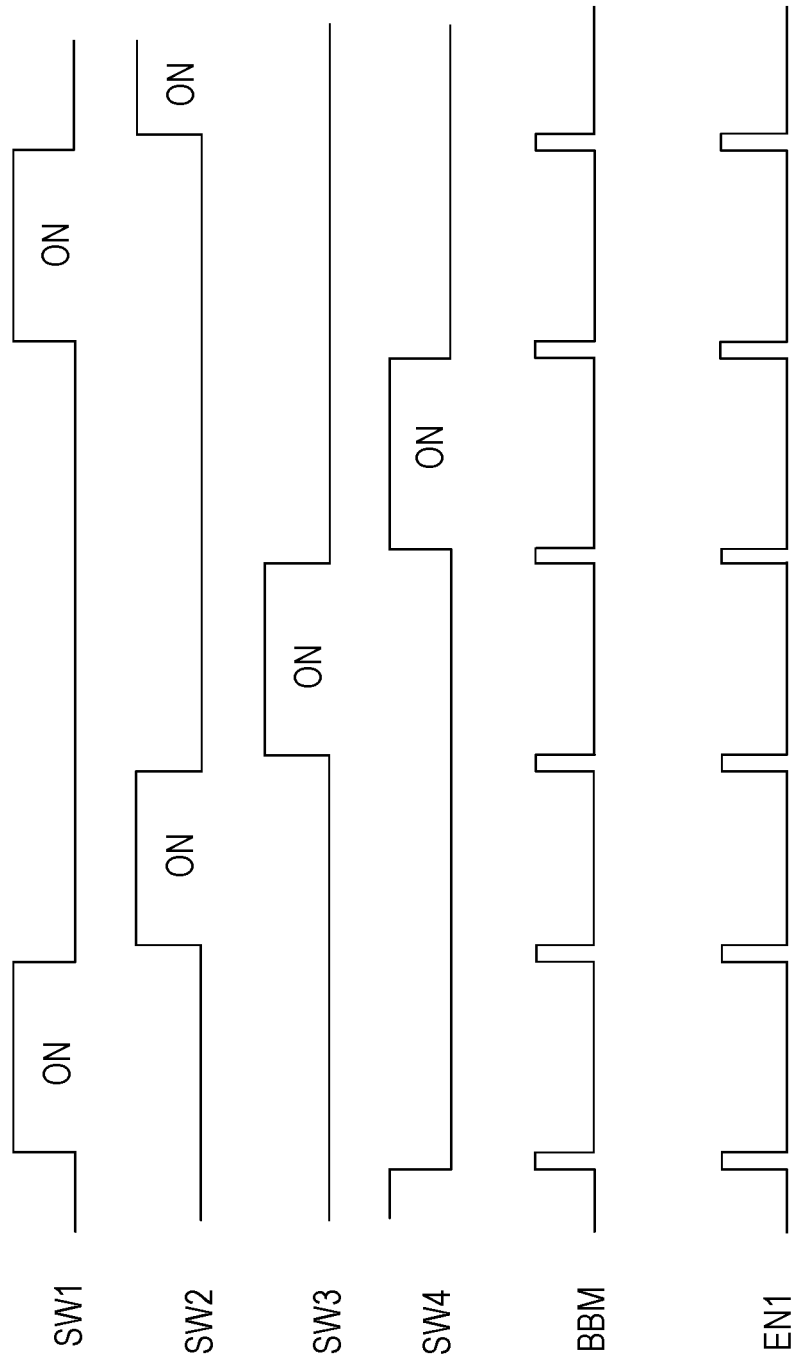
FIG. 17 shows a timing diagram of a controller for controlling a light source module, in accordance with embodiments of the present invention.
Figure 18:
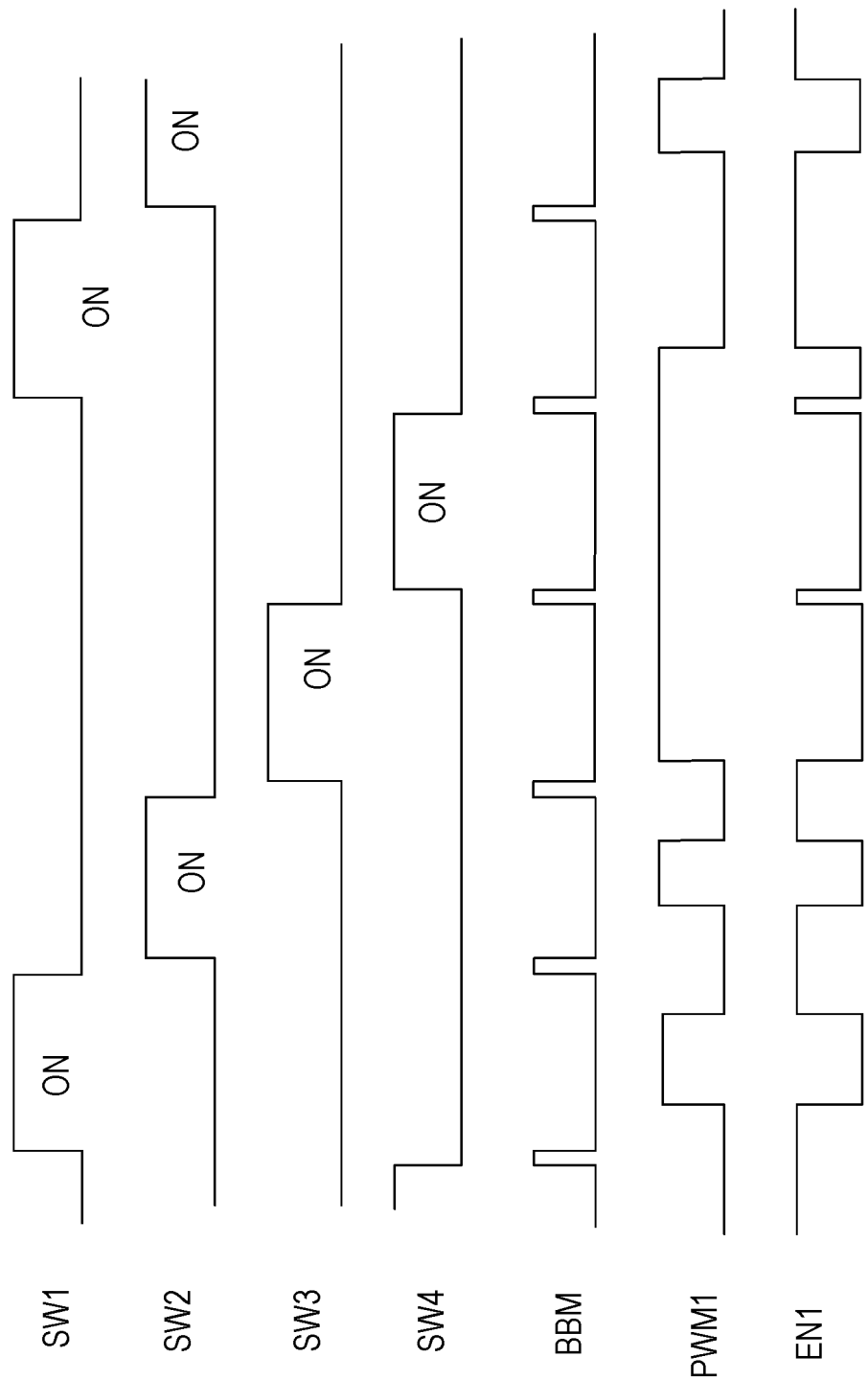
FIG. 18 shows a timing diagram of a controller for controlling a light source module, in accordance with embodiments of the present invention.

With reference back to FIG. 12, the voltage regulation unit 1211 can be enabled when the enable signal EN1 is at a first level (e.g., logic high) or disabled when the enable signal EN1 is at a second level (e.g., logic low) according to different timing schemes. In an embodiment, as illustrated in FIG. 17, the voltage regulation unit 1211 can be enabled in a sequence of time intervals BBM. The sequence of time intervals BBM are intervals between the four sequences of discrete time slots in which the switches SW1-SW4 are mutually exclusively turned on. In other words, in each of the time intervals BBM, none of the switches SW1-SW4 are turned on and the voltage regulation unit 1211 is enabled. In another embodiment, as illustrated in FIG. 18, the voltage regulation unit 511 can be enabled in the sequence of time intervals BBM, and is also enabled if a corresponding control signal PWM1 (shown in FIG. 2) is in the second state (e.g., logic low).

Figure 19:
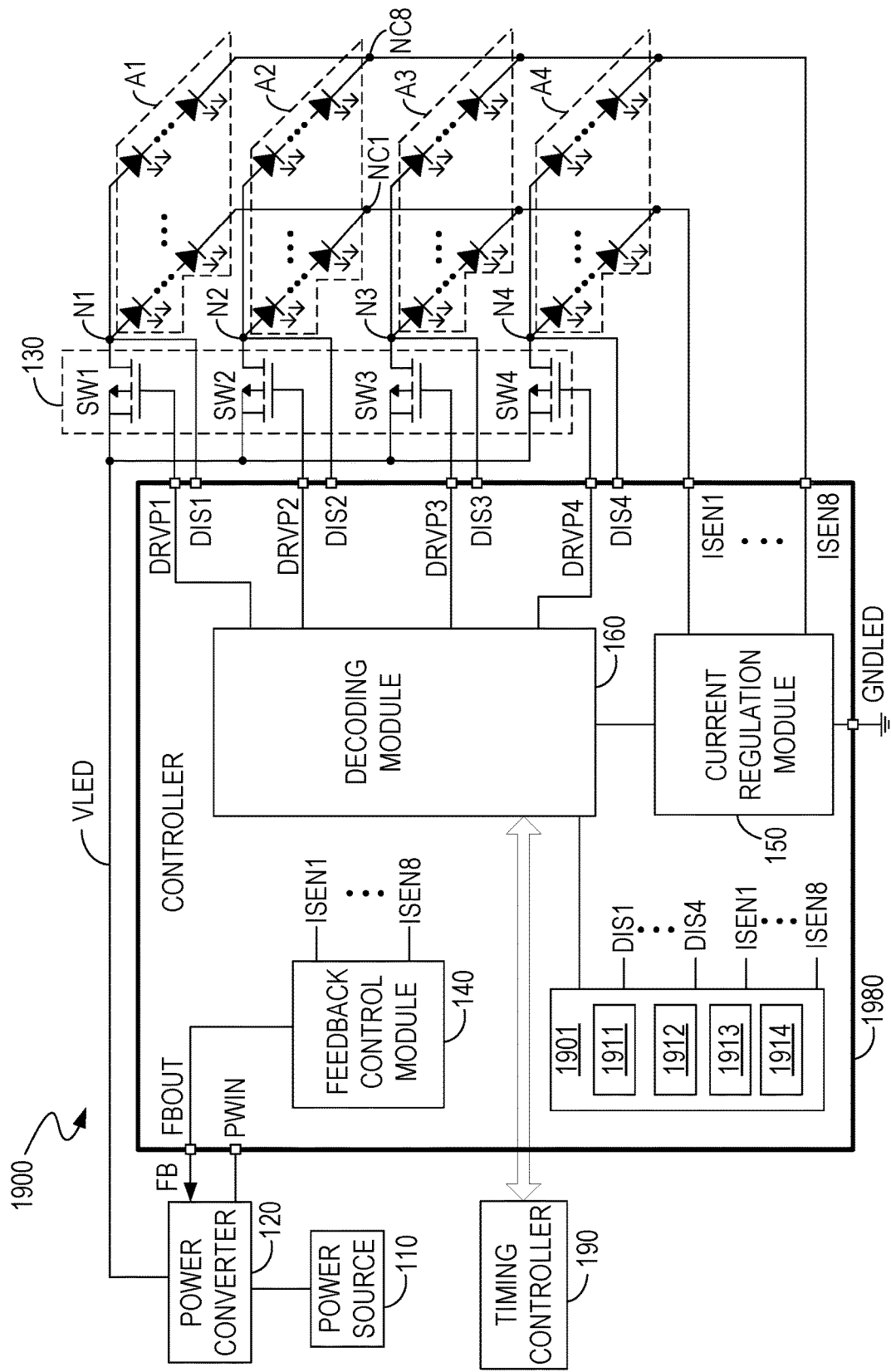
FIG. 19 shows a light source driving circuit including a controller for controlling a light source module, in accordance with embodiments of the present invention.

FIG. 19 shows a light source driving circuit 1900 including a controller 1980 for controlling a light source module, in accordance with embodiments of the present invention. Elements labeled the same as in FIG. 4 have similar functions. In the example of FIG. 19, the controller 1980 includes multiple discharging terminals DIS1-DIS4, each coupled to anodes of the LED strings in a corresponding LED array. For example, the discharging terminal DIS1 is coupled to anodes of the LED strings in the first LED array A1 (i.e., the common node N1). The discharging terminal DIS2 is coupled to anodes of the LED strings in the second LED array A2 (i.e., the common node N2), and so on. The controller 1980 includes a residual image cancelation module 1901, coupled to the decoding module 160, and operable for regulating a voltage across each LED string in each LED array to below a turn-on threshold such that none of the LED strings are turned on because of the spike current. The residual image cancelation module 1901 includes multiple voltage regulation units 1911-1914. Each of the regulation units 1911-1914 can be individually enabled or disabled by a corresponding enable signal. For example, the regulation unit 1911 can be controlled by an enable signal EN1. The enable signal EN1 can be generated by the decoding module 160 (shown in FIG. 5). The voltage regulation units 1911-1914 are coupled to the discharging terminals DIS1-DIS4 and the current sensing terminals ISEN1-ISEN8. More specifically, the voltage regulation unit 1911 is coupled to the first discharging terminal DIS1 and the current sensing terminal ISEN1, and is operable for short-circuiting the first LED string in the first LED array A1 to regulate a voltage across the first LED string in the first LED array A1 to below the turn-on threshold.

Figure 20:
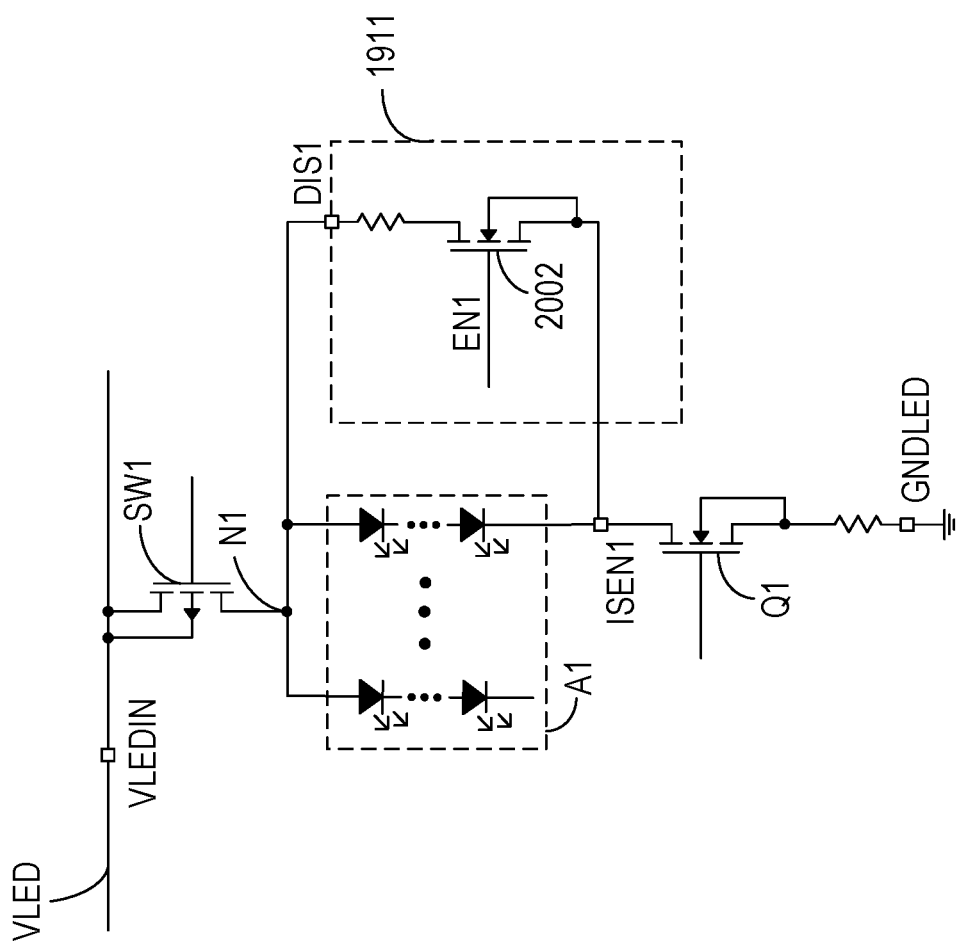
FIG. 20 shows a voltage regulation unit in a controller for controlling a light source module, in accordance with embodiments of the present invention.

FIG. 20 shows an example of the voltage regulation unit 1911 in the controller 1980, in accordance with embodiments of the present invention. In the example of FIG. 20, the voltage regulation unit 1911 includes a switch 2002. The switch 2002 is coupled between the discharging terminal DIS1 and the current sensing terminal ISEN1. When turned on by the enable signal EN1, the switch 2002 conducts a current from the anode of the first LED string of the first LED array A1 to the cathode of the first LED string of the first LED array A1, thereby decreasing a voltage across the first LED string in the first LED array A1 to below the turn-on threshold.

Figure 21:
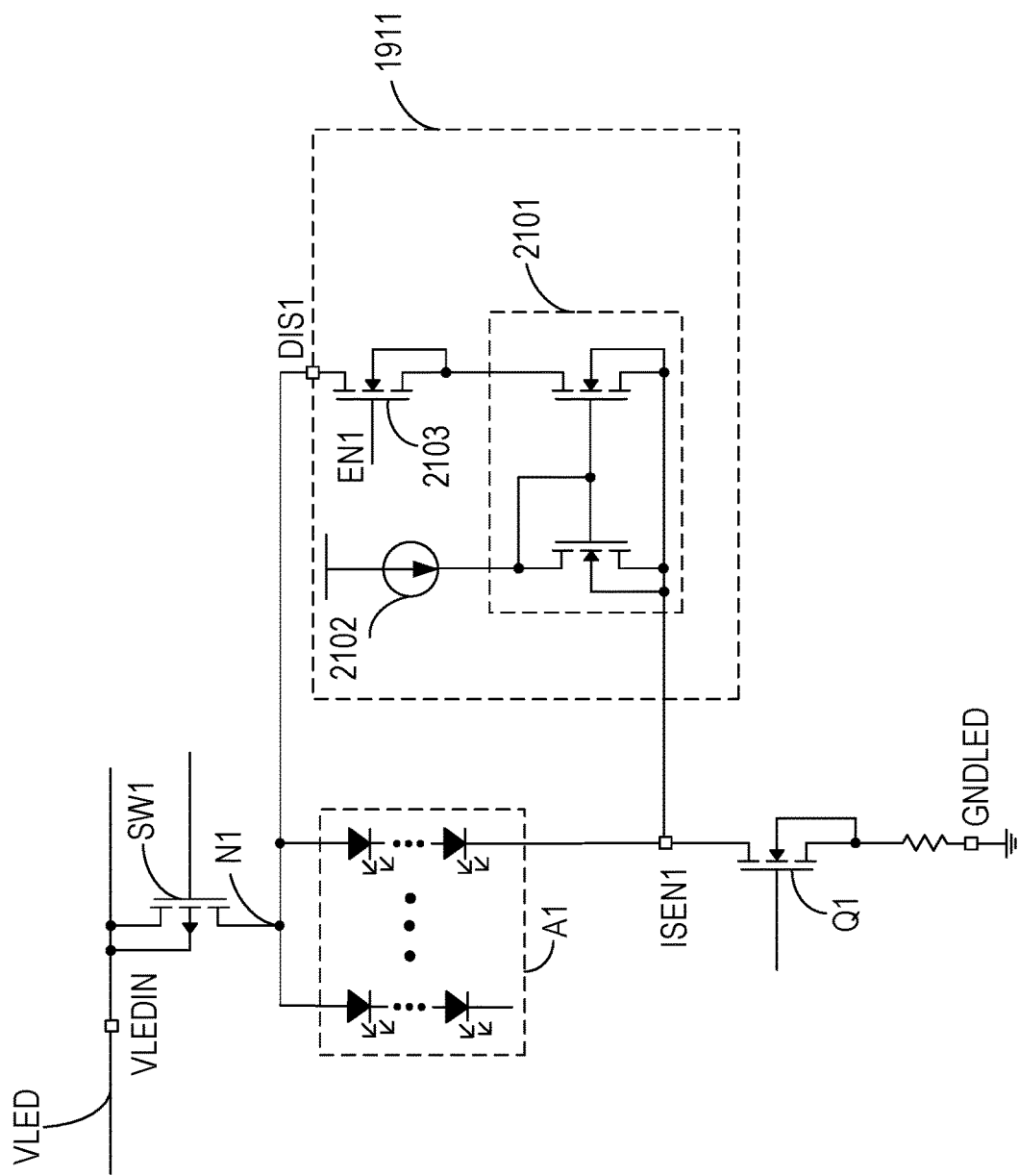
FIG. 21 shows a voltage regulation unit in a controller for controlling a light source module, in accordance with embodiments of the present invention.

FIG. 21 shows an example of the voltage regulation unit 1911 in the controller 1980, in accordance with embodiments of the present invention. In the example of FIG. 21, the voltage regulation unit 1911 includes a current mirror 2101 having a first branch coupled between the discharging terminal DIS1 and the current sensing terminal ISEN1, and a second branch coupled between a current source 2102 and the current sensing terminal ISEN1. A switch 2103 is coupled to the current mirror 901 for enabling or disabling the current mirror 2101 according to the enable signal EN1. When enabled, the current mirror 2101 conducts a current from the anode of the first LED string of the first LED array A1 through its first branch to the cathode of the first LED string of the first LED array A1, thereby decreasing a voltage across the first LED string in the first LED array A1 to below the turn-on threshold.

Figure 22:
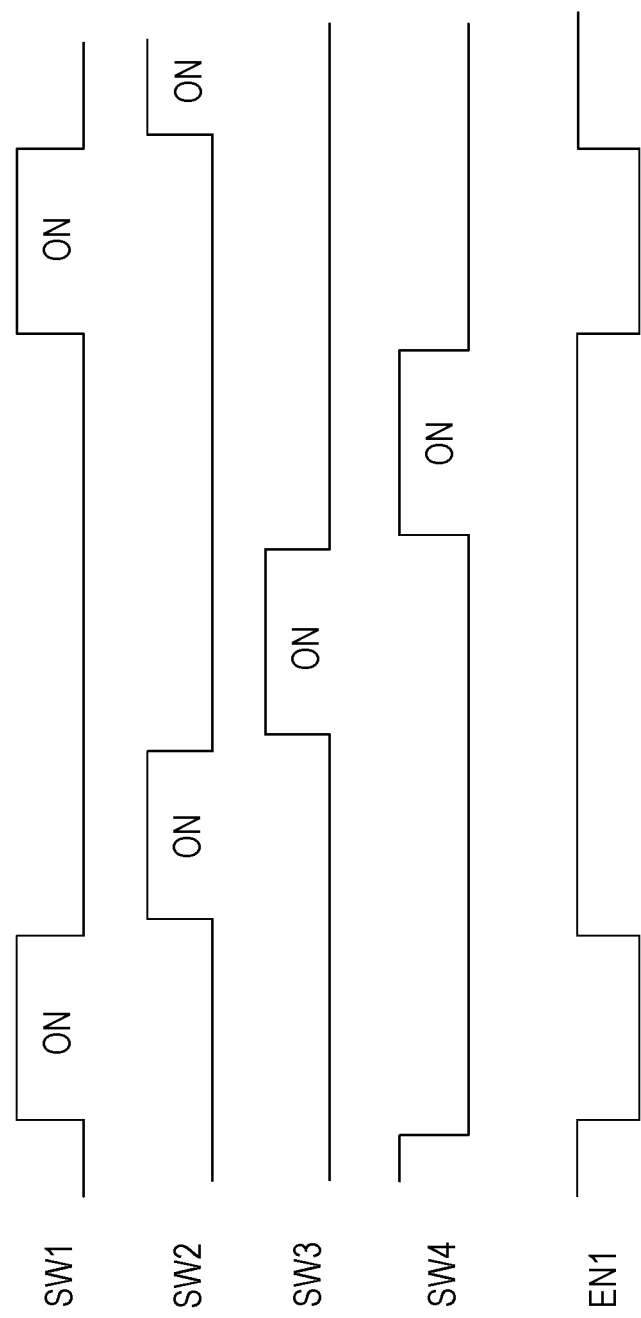
FIG. 22 shows a timing diagram of a controller for controlling a light source module, in accordance with embodiments of the present invention.
Figure 23:
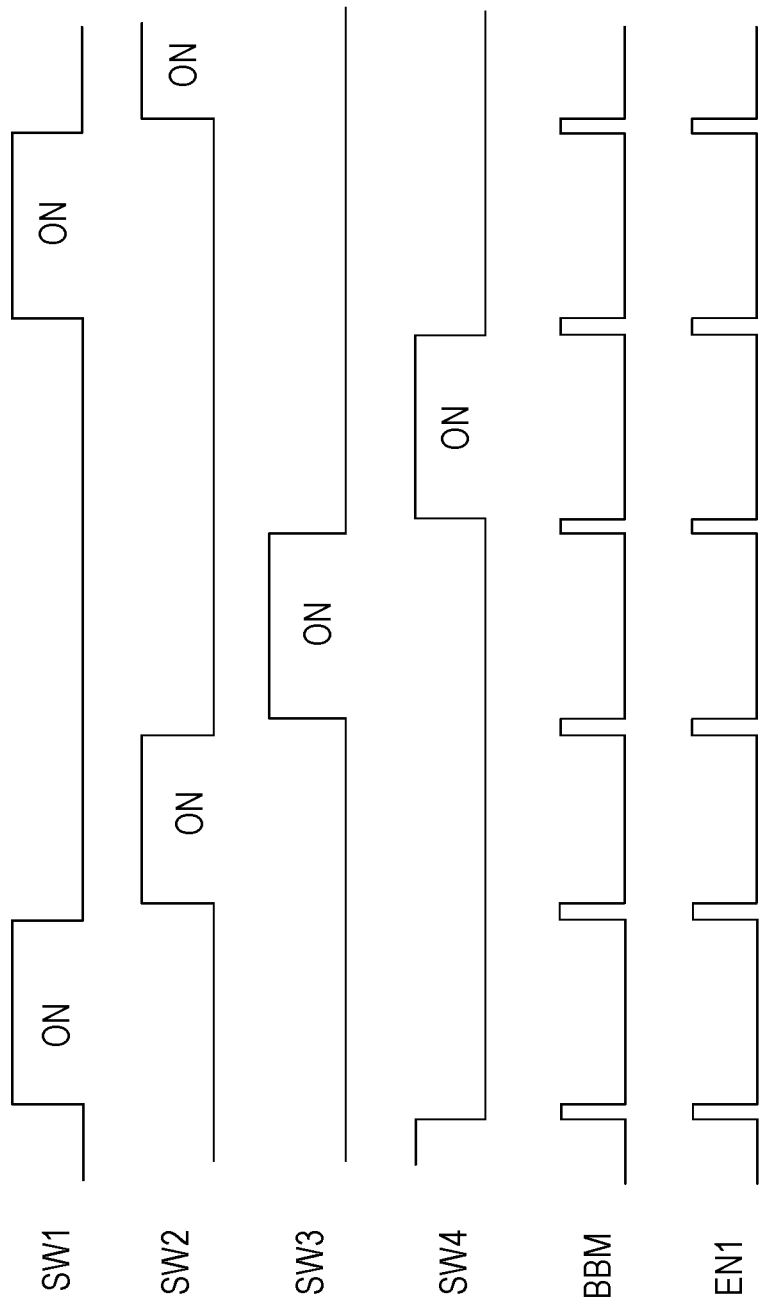
FIG. 23 shows a timing diagram of a controller for controlling a light source module, in accordance with embodiments of the present invention.

With reference back to FIG. 19, the voltage regulation unit 1911 can be enabled when an enable signal EN1 is at a first level (e.g., logic high) or disabled when the enable signal EN1 is at a second level (e.g., logic low) according to different timing schemes. In an embodiment, as illustrated in FIG. 22, the voltage regulation unit 1911 can be enabled when the first switch SW1 is off. In another embodiment, as illustrated in FIG. 23, the voltage regulation unit 1911 can be enabled in a sequence of time intervals BBM. The sequence of time intervals BBM are intervals between the four sequences of discrete time slots in which the switches SW1-SW4 are mutually exclusively turned on. In other words, in each of the time intervals BBM, none of the switches SW1-SW4 are turned on and the voltage regulation unit 1911 is enabled.

Figure 24:
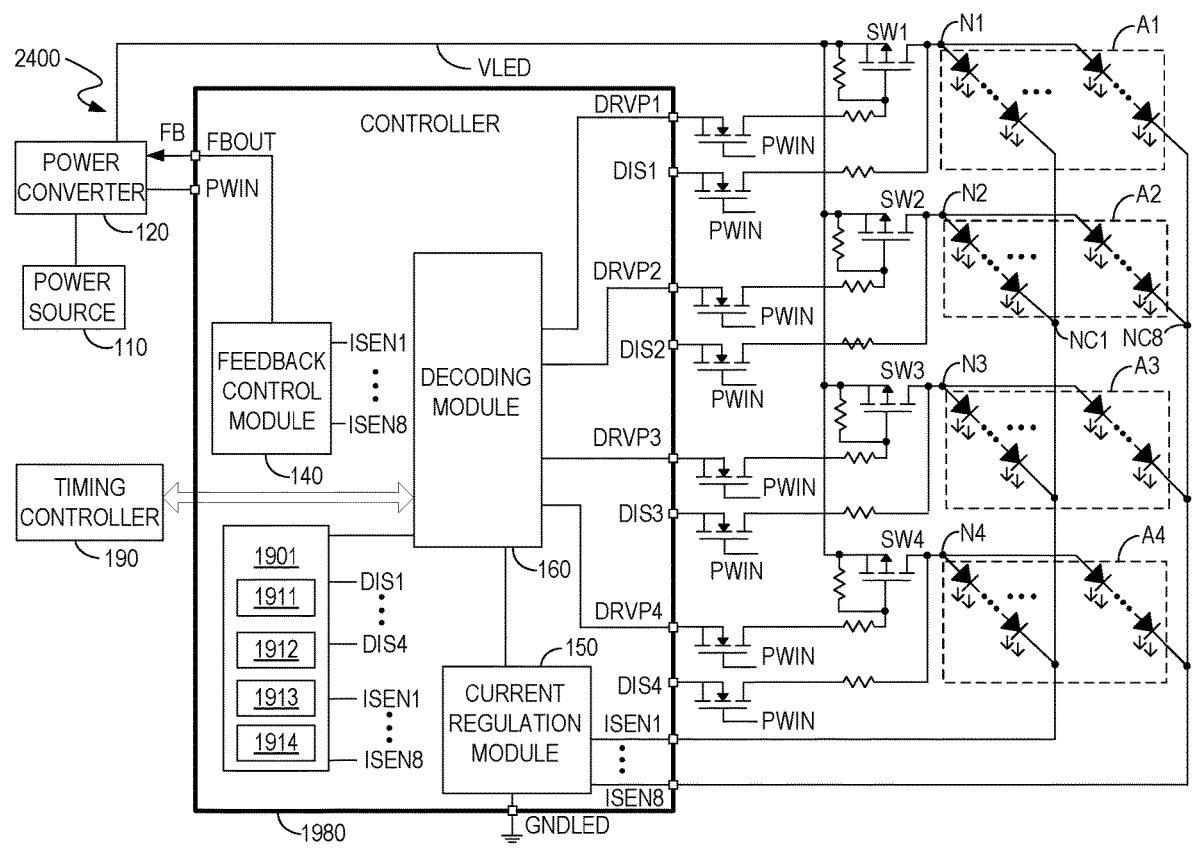
FIG. 24 shows a light source driving circuit including a controller for controlling a light source module, in accordance with embodiments of the present invention.

FIG. 24 shows a light source driving circuit 2400 including a controller 1980 for controlling a light source module, in accordance with embodiments of the present invention. Elements labeled the same as in FIG. 19 have similar functions. In the example of FIG. 24, the switches SW1-SW4 are p-type metal-oxide semiconductor (PMOS) transistors. Each of the driving terminals DRVP1-DRVP4 is coupled to a gate of a corresponding switch among the switches SW1-SW4 through an n-type metal-oxide semiconductor (NMOS) transistor whose gate is coupled to a power source (e.g., coupled to the power converter 120 through a terminal PWIN). Each of the discharging terminal DIS1-DIS4 is coupled to a corresponding common node among N1-N4 through an NMOS transistor whose gate is also coupled to a power source (e.g., coupled to the power converter 120 through a terminal PWIN). With such a configuration, the controller 1980 works with light source modules that require an input voltage VLED that is beyond a voltage tolerance of the controller 1980. Similar configurations can also be applied to the controller 580 in FIG. 5 and the controller 1280 in FIG. 12.

As described above, the present invention includes controllers for controlling light source modules. The controllers are operable for regulating a voltage across each LED string in the light source module to below a turn-on threshold when that LED string is not supposed to be turned on. Advantageously, the LED strings will not be turned on unintentionally, thus eliminating residual image phenomena on display devices.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller operable for controlling a light source module comprising a first Light-Emitting Diode (LED) array and a second LED array, wherein said first LED array comprises a first plurality of LED strings and said second LED array comprises a second plurality of LED strings, said controller comprising:

a first driving terminal, coupled to a first switch, wherein said first switch is coupled between a power converter and said first LED array;

a second driving terminal, coupled to a second switch, wherein said second switch is coupled between said power converter and said second LED array; and a plurality of current sensing terminals, coupled to said first LED array and to said second LED array, operable for sensing a current of each LED string in said first LED array and for sensing a current of each LED string in said second LED array, wherein anodes of said first plurality of LED strings are connected to a first common node, wherein said first common node is connected to said first switch, wherein anodes of said second plurality of LED strings are connected to a second common node, wherein said second common node is connected to said second switch, wherein a cathode of a first LED string in said first LED array and a cathode of a first LED string in said second LED array are connected to a third common node, wherein said third common node is connected to a first current sensing terminal of said current sensing terminals, and wherein said controller is operable for turning on said first switch by said first driving terminal to deliver electric power from said power converter to said first LED array in a first sequence of discrete time slots, and for turning on said second switch by said second driving terminal to deliver electric power from said power converter to said second LED array in a second sequence of discrete time slots, wherein said first sequence of discrete time slots and said second sequence of discrete time slots are mutually exclusive.

2. The controller of claim 1, further comprising:
a voltage regulation unit, coupled to said first LED string in said first LED array, operable for regulating a voltage across said first LED string in said first LED array to below a threshold.

3. The controller of claim 2, further comprising:
a first discharging terminal coupled to said first common node,
wherein said voltage regulation unit is coupled to said first discharging terminal and is operable for decreasing a voltage at an anode of said first LED string in said first LED array to regulate said voltage across said first LED string in said first LED array to below said threshold.

4. The controller of claim 3, wherein said voltage regulation unit comprises:
a discharging switch coupled between said first discharging terminal and ground; and
an amplifier having a non-inverting input terminal for receiving a first voltage signal, an inverting input terminal coupled to said first discharging terminal, and an output terminal coupled to said discharging switch.

5. The controller of claim 3, wherein said voltage regulation unit comprises:
a discharging switch coupled between said first discharging terminal and ground; and
a comparator having a non-inverting input terminal for receiving a second voltage signal, an inverting input terminal coupled to said first discharging terminal, and an output terminal coupled to said discharging switch.

6. The controller of claim 3, wherein said voltage regulation unit comprises:
a discharging switch coupled between said first discharging terminal and ground.

7. The controller of claim 3, wherein said voltage regulation unit comprises:
a current mirror having a first branch coupled between said first discharging terminal and ground, and having a second branch coupled between a current source and ground.

8. The controller of claim 3, wherein said a voltage regulation unit is enabled when said first switch is off.

9. The controller of claim 3, wherein said a voltage regulation unit is enabled in a sequence of time intervals between said first sequence of discrete time slots and said second sequence of discrete time slots, wherein said first switch and said second switch are off in said sequence of time intervals.

10. The controller of claim 3, wherein said first switch comprises a p-type metal-oxide semiconductor (PMOS) transistor, wherein said first driving terminal is coupled to a gate of said PMOS through a first n-type metal-oxide semiconductor (NMOS) transistor, wherein said first discharging terminal is coupled to said first common node through a second NMOS transistor, wherein a gate of said first NMOS transistor and a gate of said second NMOS transistor are coupled to a power source.

11. The controller of claim 2, further comprising:
a power terminal coupled to said power converter,
wherein said voltage regulation unit is coupled to said power terminal and said first current sensing terminal and is operable for increasing a voltage at a cathode of said first LED string in said first LED array to regulate said voltage across said first LED string in said first LED array to below said threshold.

12. The controller of claim 11, wherein said voltage regulation unit comprises:
a charging switch coupled between said power terminal and said first current sensing terminal; and
an amplifier having a non-inverting input terminal for receiving a first voltage signal, an inverting input terminal coupled to said first current sensing terminal, and an output terminal coupled to said charging switch.

13. The controller of claim 11, wherein said voltage regulation unit comprises:
a charging switch coupled between said power terminal and said first current sensing terminal; and
a comparator having a non-inverting input terminal for receiving a second voltage signal, an inverting input terminal coupled to said first current sensing terminal, and an output terminal coupled to said charging switch.

14. The controller of claim 11, wherein said voltage regulation unit comprises: a charging switch coupled between said power terminal and said first current sensing terminal.

15. The controller of claim 11, wherein said voltage regulation unit comprises:
a current mirror having a first branch coupled between said power terminal and said first current sensing terminal, and having a second branch coupled between said power terminal and a current source.

16. The controller of claim 11, wherein said voltage regulation unit is enabled in a sequence of time intervals between said first sequence of discrete time slots and said second sequence of discrete time slots, wherein said first switch and said second switch are off in said sequence of time intervals.

17. The controller of claim 2, further comprising:
a first discharging terminal coupled to said first common node, wherein said voltage regulation unit is coupled to said first discharging terminal and said first current sensing terminal and is operable for short-circuiting said first LED string in said first LED array to regulate said voltage across said first LED string in said first LED array to below said threshold.

18. The controller of claim 17, wherein said voltage regulation unit comprises:
a switch coupled between said first discharging terminal and said first current sensing terminal.

19. The controller of claim 17, wherein said voltage regulation unit comprises:
a current mirror having a first branch coupled between said first discharging terminal and said first current sensing terminal, and having a second branch coupled between a current source and said first current sensing terminal.

20. The controller of claim 17, wherein said voltage regulation unit is enabled when said first switch is off.

21. The controller of claim 17, wherein said a voltage regulation unit is enabled in a sequence of time intervals between said first sequence of discrete time slots and said second sequence of discrete time slots, wherein said first switch and said second switch are off in said sequence of time intervals.

22. A controller, coupled to a power source, operable for controlling a light source module comprising a first Light-Emitting Diode (LED) array and a second LED array, wherein said first LED array comprises a first plurality of LED strings and said second LED array comprises a second plurality of LED strings, said controller comprising:
a decoding module operable for receiving a timing signal from a timing controller, and for generating a switching signal to control a first switch coupled between a power converter and said first LED array based on said timing signal and to control a second switch coupled between said power converter and said second LED array based on said timing signal; and a residual image cancelation module, coupled to said decoding module, operable for regulating a voltage across each LED string in said first LED array to below a threshold and for regulating a voltage across each LED string in said second LED array to below said threshold,
wherein said decoding module is operable for turning on said first switch in a first sequence of discrete time slots, and for turning on said second switch in a second sequence of discrete time slots, wherein said first sequence of discrete time slots and said second sequence of discrete time slots are mutually exclusive.

23. The controller of claim 22, wherein said residual image cancelation module comprises a voltage regulation unit coupled to an anode of a first LED string in said first LED array, wherein said voltage regulation unit is operable for decreasing a voltage at said anode of said first LED string in said first LED array to regulate a voltage across said first LED string in said first LED array to below said threshold.

24. The controller of claim 22, wherein said residual image cancelation module comprises a voltage regulation unit coupled to a cathode of a first LED string in said first LED array, wherein said voltage regulation unit is operable for increasing a voltage at said cathode of said first LED string in said first LED array to regulate a voltage across said first LED string in said first LED array to below said threshold.

25. The controller of claim 22, wherein said residual image cancelation module comprises a voltage regulation unit coupled to a first LED string in said first LED array, wherein said voltage regulation unit is operable for short-circuiting said first LED string in said first LED array to regulate a voltage across said first LED string in said first LED array to below said threshold.

* * * * *